United States Patent [19]

Isnardi et al.

[11] Patent Number: 4,888,641
[45] Date of Patent: Dec. 19, 1989

[54] EXTENDED DEFINITION WIDESCREEN TELEVISION SYSTEM USING PLURAL SIGNAL TRANSMISSION CHANNELS

[75] Inventors: Michael A. Isnardi, Plainsboro; Terrence R. Smith, Westmont; Jack S. Fuhrer, Princeton Junction, all of N.J.; Barbara J. Roeder, Point Pleasant, Pa.

[73] Assignee: General Electric Company, Princeton, N.J.

[21] Appl. No.: 252,340

[22] Filed: Oct. 3, 1988

[30] Foreign Application Priority Data

Feb. 29, 1988 [GB] United Kingdom ............... 8804720

[51] Int. Cl.⁴ .................... H04N 7/04; H04N 7/08
[52] U.S. Cl. ............................... 358/141; 358/12
[58] Field of Search ................. 358/11, 12, 135, 140, 358/141, 142

[56] References Cited

U.S. PATENT DOCUMENTS

| | | | |
|---|---|---|---|
| 4,605,950 | 8/1986 | Goldberg et al. | 358/141 |
| 4,631,574 | 12/1986 | LoCicero et al. | 358/12 |
| 4,694,338 | 9/1987 | Tsinberg | 358/12 |
| 4,800,426 | 1/1989 | Glenn | 358/141 |

FOREIGN PATENT DOCUMENTS 3341393 6/1985 Fed. Rep. of Germany.

OTHER PUBLICATIONS

"An Extended Definition Television System Using Quadrature Modulation of the Video-Carrier with Inverse Nyquist Filter"; Yasumoto et al.; IEEE Transactions on Consumer Electronics; vol. CE-33, No. 3, Aug. 1987; pp. 173-180.
"Extended Definition TV Fully Compatible with Existing Standards"; Fukinuki et al.; IEEE Transactions on Communications, vol. COM-32, No. 8, Aug. 1984; pp. 948-953.
"A Single Channel, NTSC Compatible Widescreen EDTV System"; Isnardi et al.; Image Technology, Apr. 1988; pp. 118-119.
"HDTV Compatible Transmission System", by William E. Glenn et al., SMPTE Journal, Mar. 1987, pp. 242-246.
"NTSC Compatible High Definition Television Emission System", by A. G. Toth et al., IEEE Transactions on Consumer Electronics, vol. 34, No. 1, Feb. 1988, pp. 40-47.
"A Compatible High-Definition Television System (SLSC) with Chrominance and Aspect Ratio Improvements", by J. L. LoCicero et al., SMPTE Journal, May 1985, pp. 546-558.
"ENTSC Two-Channel Compatible HDTV System", by M. Tsinberg, IEEE Transactions on Consumer Electronics, vol. CE-33, No. 3, Aug. 1987, pp. 146-153.
"Advanced Television Systems", by Robert Hopkins, IEEE Transactions on Consumer Electronics, vol. 34, No. 1, Feb. 1988, pp. 1-15.
"Decoding Issues in the ACTV System", by M. A. Isnardi et al., IEEE Transactions on Consumer Electronics, vol. 34, No. 1, Feb. 1988, pp. 111-120.

Primary Examiner—John W. Shepperd
Assistant Examiner—Michael D. Parker
Attorney, Agent, or Firm—Joseph S. Tripoli; Eric P. Herrmann; Ronald H. Kurdyla

[57] ABSTRACT

A system for transmitting and receiving signals representing a high-definition television (HDTV) image is disclosed. The signals are sent over two conventional 6 MHz NTSC channels. A first signal, the main signal, is developed by encoding circuitry from HDTV source signals to be compatible with existing NTSC receivers in that it produces a display on those receivers which is not significantly distorted. The main signal includes psychophysically hidden video information which may be used by an extended definition receiver to produce a widescreen image having a higher level of detail than a conventional video image. A second signal, the auxiliary signal, is developed at the transmitter by decoding the main signal and subtracting the decoded main signal from the original HDTV source signals. The auxiliary signal, which includes frequency components from 0 Hz to 20 MHz is split into three bands, A (0 Hz-6MHz), B (6 MHz-12 MHz) and C (12 MHz-18 MHz). Bands B and C are frequency converted to occupy the 0 Hz-6 MHz band and are time division multiplexed on a line by line basis. The combined B and C bands are then time division multiplexed with the A band on a frame by frame basis for still images. For moving images, only the A band is sent. The receiver decodes the main signal, and, using a motion signal sent with the main signal, decodes the auxiliary signal. The decoded main and auxiliary signals are combined to reproduce the HDTV image.

10 Claims, 37 Drawing Sheets

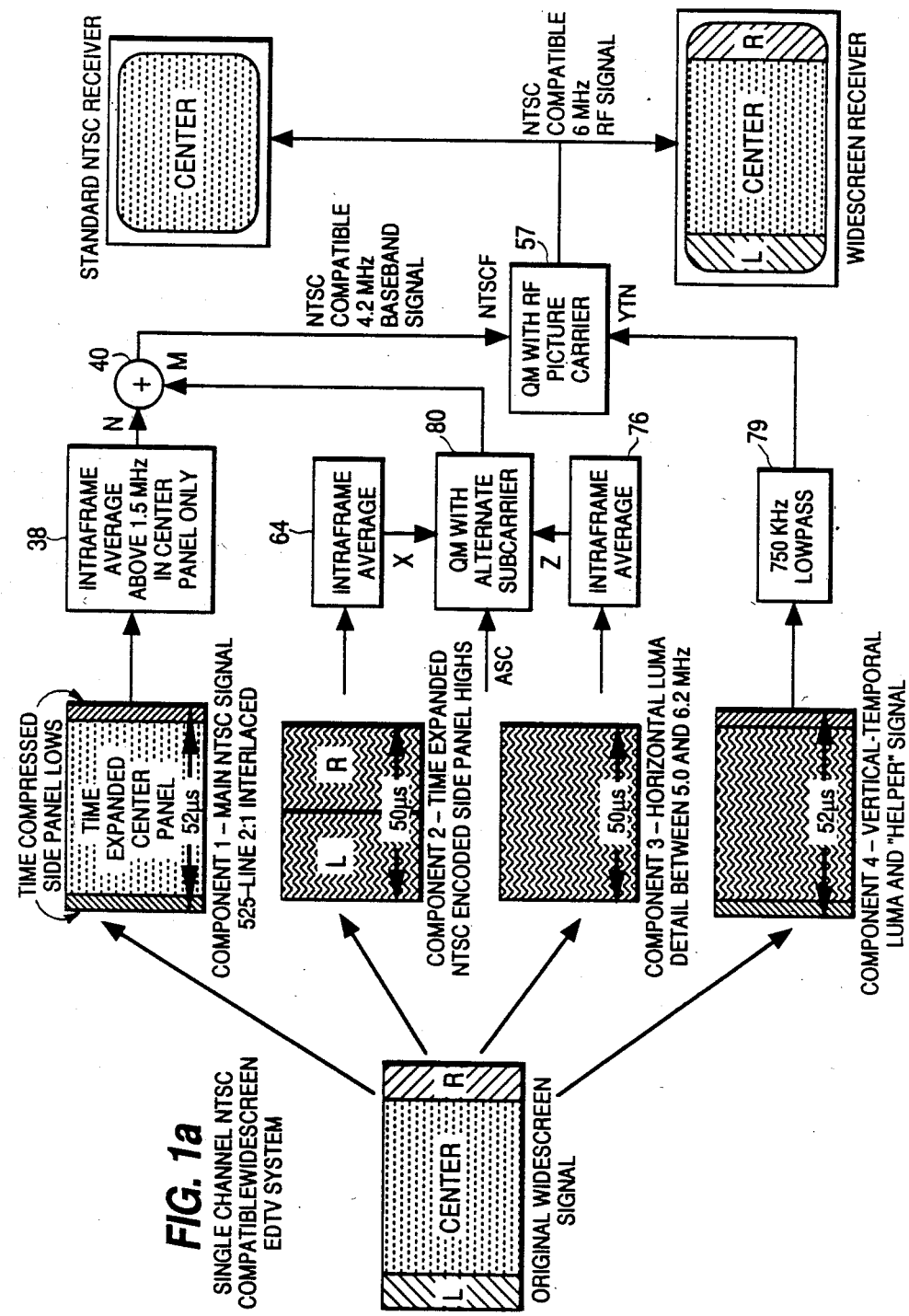

1050 INTERFACE TO 525 PROGRESSIVE SCAN CONVERTER

| | WEIGHTING COEFFICIENTS | | | | | | | | |
|---|---|---|---|---|---|---|---|---|---|
| | a1 | a2 | a3 | a4 | a5 | a6 | a7 | a8 | a9 |
| V-T BANDPASS FILTER | $-\frac{1}{16}$ | $-\frac{1}{8}$ | $\frac{1}{8}$ | $-\frac{1}{16}$ | $\frac{1}{4}$ | $-\frac{1}{16}$ | $\frac{1}{8}$ | $-\frac{1}{8}$ | $-\frac{1}{16}$ |
| V-T BANDSTOP FILTER | $\frac{1}{16}$ | $\frac{1}{8}$ | $-\frac{1}{8}$ | $\frac{1}{16}$ | $\frac{3}{4}$ | $\frac{1}{16}$ | $-\frac{1}{8}$ | $\frac{1}{8}$ | $\frac{1}{16}$ |
FIG. 10a
FIG. 10b
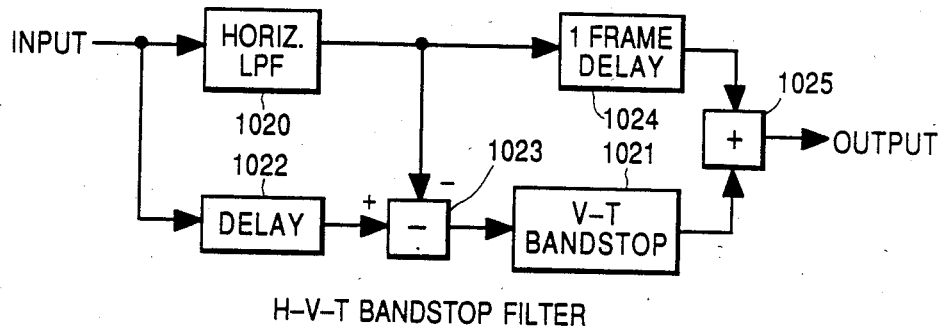
H-V-T BANDSTOP FILTER
FIG. 10c
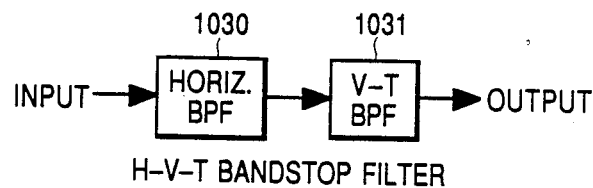
H-V-T BANDSTOP FILTER

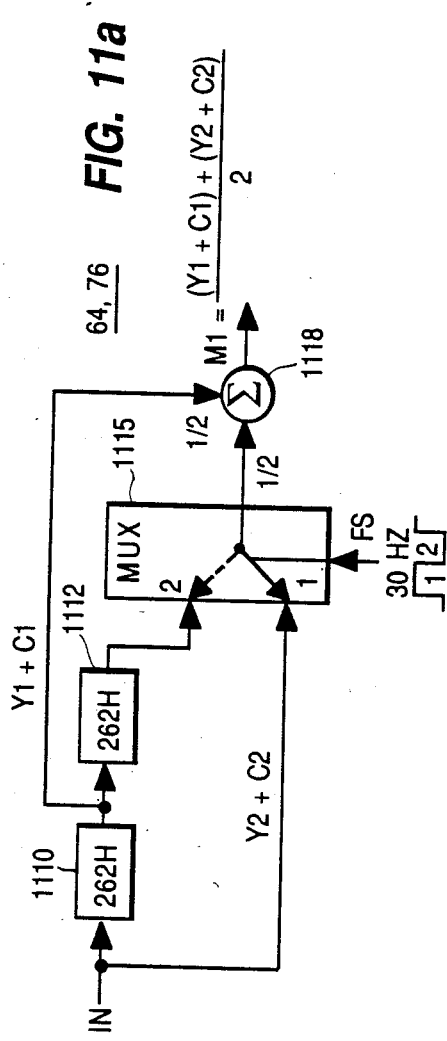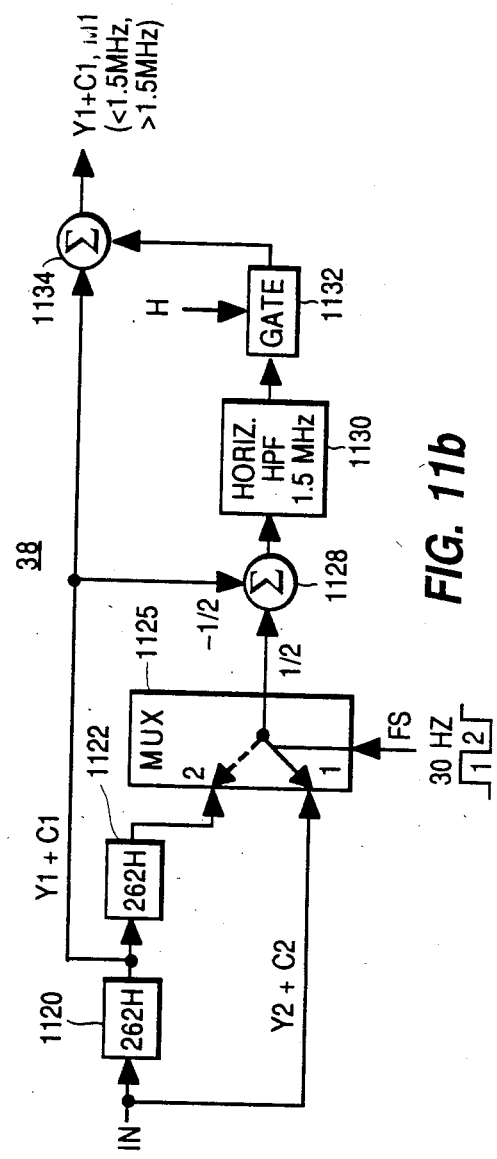

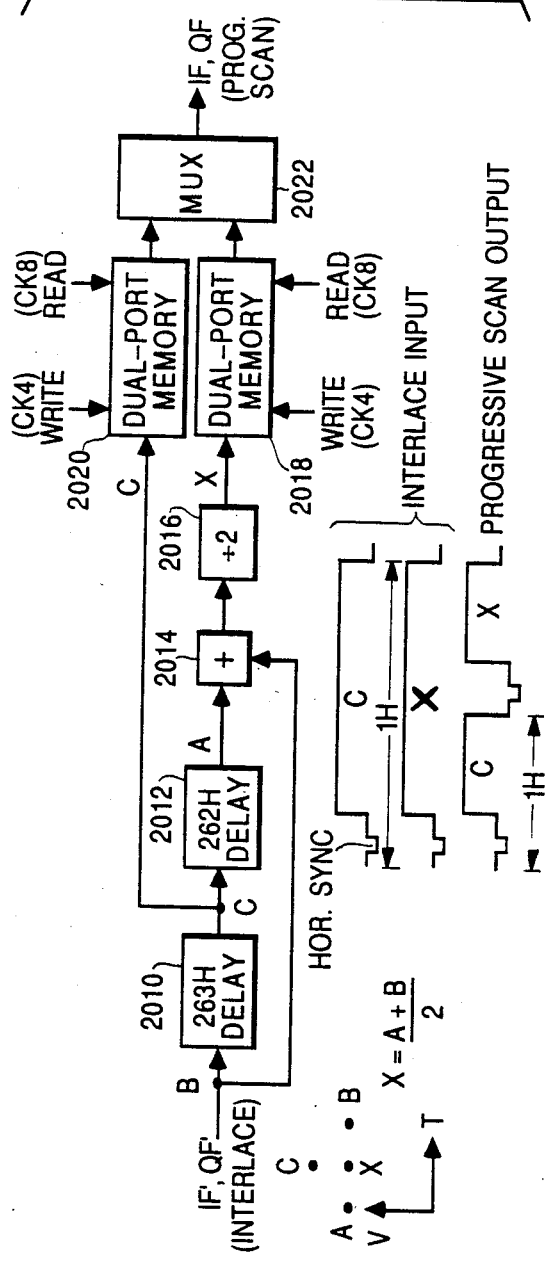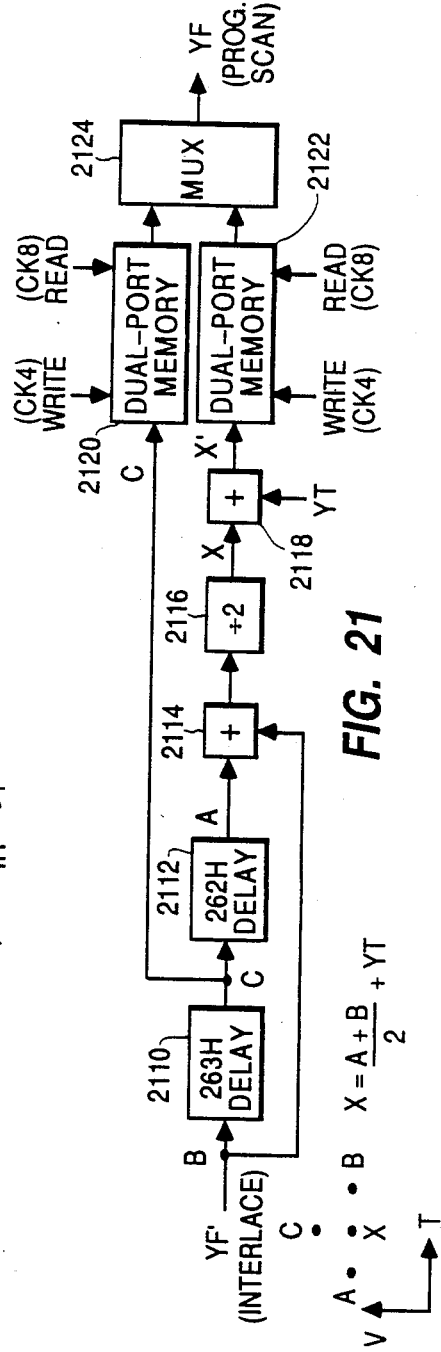
FIG. 20
FIG. 21

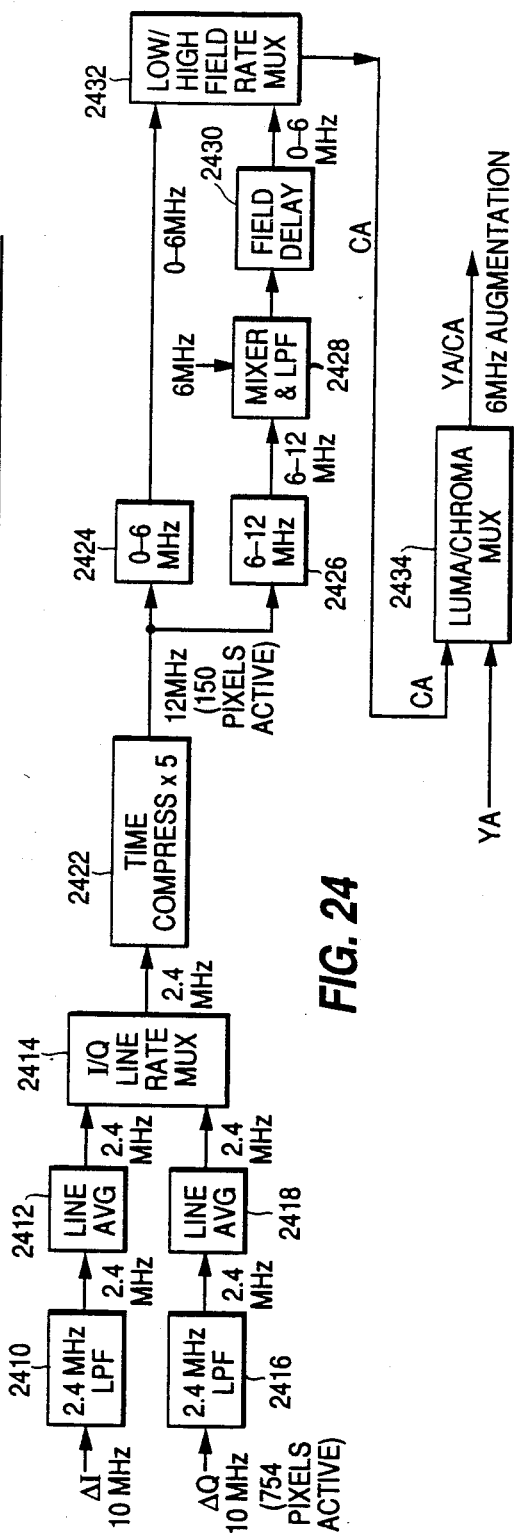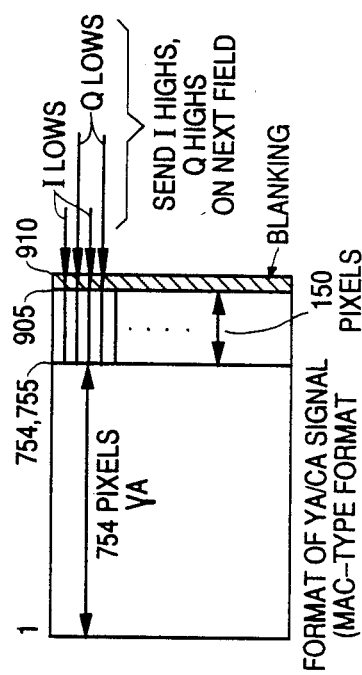
FIG. 24
FIG. 24a

LUMINANCE AUGMENTATION SIGNAL DECODER

EXTENDED DEFINITION WIDESCREEN TELEVISION SYSTEM USING PLURAL SIGNAL TRANSMISSION CHANNELS

BACKGROUND OF THE INVENTION

This invention relates to a television signal transmission system which utilizes more than one transmission channel to send signals representing a high-definition widescreen image.

A conventional television receiver, such as a receiver in accordance with NTSC broadcast standards, has a 4:3 aspect ratio (the ratio of the width to the height of a displayed image). Recently, there has been interest in using higher aspect ratios for television receiver systems, such as 2:1, 16:9 or 5:3, since such higher aspect ratios more nearly approximate the aspect ratio of the human eye than does the 4:3 aspect ratio. Video images having aspect ratios of 5:3 and 16:9 have received particular attention since these ratios approximate the aspect ratio of many motion picture films. In addition, there has been interest in increasing the level of detail in the reproduced image above that of a conventional television image to more nearly approximate the level of detail found in motion picture film. However, television systems which transmit signals representing high-definition widescreen images should be designed to send a video signal which is compatible with existing television receivers since the widespread adoption of an incompatible system may be difficult.

A survey of several proposed high-definition widescreen television systems may be found in a paper by Robert Hopkins entitled "Advanced Television Systems", IEEE Transactions on Consumer Electronics, February 1988, pp. 1-15. Of the eight systems described in this article, five are compatible with existing NTSC television receivers to the extent that the transmitted signals may be received by a conventional NTSC receiver, without preprocessing by a converter, to produce a 4:3 image that is only slightly degraded relative to a standard NTSC image. These systems were developed by: AT&T Bell laboratories (the Bell system), Dr. William Glenn of the New York Institute of Technology (the Glenn system), the Del Ray Group (the Del Ray system), North American Philips (the NAP system) and a consortium of NBC and the David Sarnoff Research Center (the NBC system).

In the Bell system, two 6 MHz television channels are used to transmit signals representing a high-definition widescreen image. One channel carries a standard NTSC signal representing relatively low frequency luminance and chrominance signal components of the high-definition widescreen image. The second channel carries high frequency luminance and chrominance signals which may be used, by a special receiver, to augment the image represented by the NTSC signal.

The Glenn system also uses two channels, one of which carries an NTSC compatible signal. The second channel in the Glenn system uses only 3 MHz of the 6 MHz bandwidth and conveys image detail information which has been filtered to reduce its temporal resolution (i.e. to lower its frame rate). A frame store is used to combine the NTSC signal with the low-frame-rate high-detail signal. A widescreen effect is achieved in the Glenn system by increasing the vertical blanking interval while decreasing the horizontal blanking interval.

The Del Ray system uses only one 6 MHz channel which carries an NTSC compatible signal. This signal defines a high-definition image over six field periods. The high-definition image is reconstructed by a special receiver which combines the six fields in a frame store. The Del Ray system also increases the vertical blanking interval to achieve a widescreen effect.

The NAP system transmits a standard NTSC signal in one channel and an augmentation signal in a second channel. The augmentation signal is combined with the NTSC compatible signal by a special receiver to generate a widescreen, progressively scanned image. The horizontal detail of the image produced by the NAP system is substantially the same as that of an NTSC image.

The NBC system is the starting point for the invention set forth below. This system is described in greater detail in a paper by M. Isnardi et al. entitled "Decoding Issues in the ACTV System"; IEEE Transactions on Consumer Electronics, February, 1988, pp. 111-120. A portion of this system is also described in U.S. patent application Ser. No. 089,637 entitled "Apparatus for Processing High Frequency Information in a Widescreen Television System", which was allowed on Apr. 22, 1988. These references are hereby incorporated by reference. The system described in the referenced article and patent application uses a single 6 MHz channel to convey an augmented NTSC signal. When this signal is processed by a conventional NTSC receiver, a conventional television image is produced. However, when this signal is processed by a receiver which decodes and combines the various component signals, an extended definition, widescreen image is produced. The component signals which augment the basic NTSC signal are assigned to inefficiently used areas of the NTSC spectrum. Although this high-definition, widescreen image has more horizontal and vertical detail than a conventional television image and is overall very pleasing to the viewer, it may have less diagonal detail. Moreover, the overall level of detail is still less than that of motion picture film.

SUMMARY OF THE INVENTION

Therefore, it is desirable to provide an auxiliary signal for the NBC type of system which increases the level of detail in the reproduced image to more nearly match that of motion picture film.

The present invention is embodied in a system which generates signals representing a high-definition widescreen image and transmits the signals over two television channels. An input video signal, representing an image having approximately the same level of detail as motion picture film, is applied to the system. The system includes a first signal encoder which processes a portion of the input video signal to produce an encoded main video signal representing an enhanced image having greater detail than a conventional television image but less detail than the image represented by the input video signal. The main video signal is applied to decoding circuitry which generates a baseband signal representing the enhanced image. The system further includes circuitry which develops a difference signal representing the difference between the input video signal and the decoded baseband signal. The difference signal is processed by a second signal encoder to produce an auxiliary signal. The main and auxiliary signals are transmitted via separate television channels.

A receiver embodying the present invention receives and decodes the main and auxiliary signals and then combines the decoded signals to produce signals representing the high definition widescreen image.

BRIEF DESCRIPTION OF THE DRAWINGS

FIG. 1a is a diagram illustrating the operation of a single channel encoder suitable for use in the system shown in FIG. 1.

FIGS. 10 and 10a–10c are block diagrams and a chart illustrating the structure of various vertical-temporal and horizontal-vertical-temporal filters used in the single channel encoder shown in FIG. 1b and in a single channel decoder shown in FIG. 14.

FIGS. 11a and 11b are block diagrams of circuitry suitable for use as the highs intraframe averager of the single channel encoder shown in FIG. 1b.

FIGS. 20 and 21 are block diagrams of interlace to progressive scan converters suitable for use in the circuitry shown in FIG. 14.

FIG. 22a is a pixel diagram useful for explaining the operation of the circuitry shown in FIG. 22.

FIG. 24 is a block diagram of an auxiliary channel chrominance signal encoder suitable for use in the auxiliary channel encoder of the system shown in FIG. 1.

FIG. 24a is a video field diagram useful for explaining the operation of the circuitry shown in FIG. 24.

DETAILED DESCRIPTION

Figure 1:
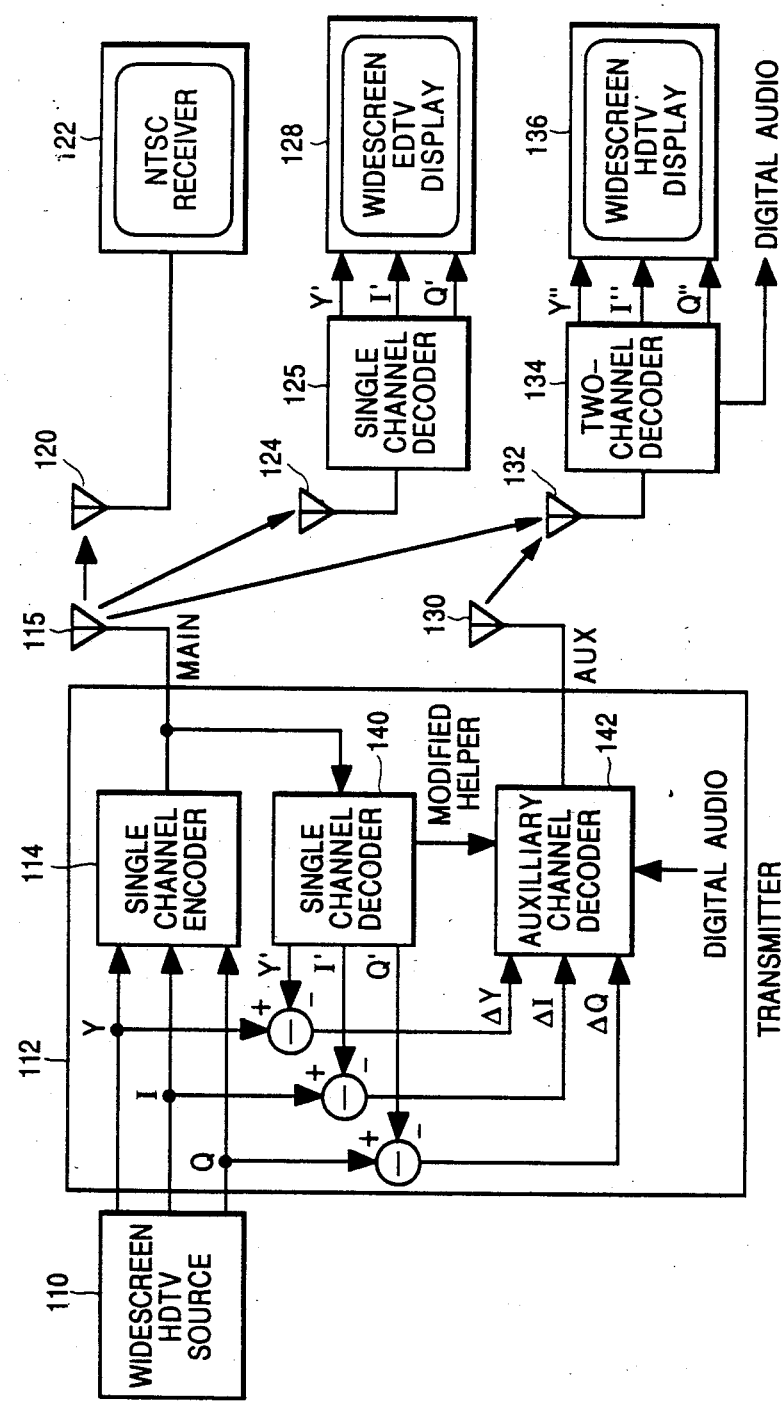
FIG. 1 is a block diagram of a two channel television signal transmission system which operates in accordance with the present invention.

In the drawings, single line arrows may represent busses for conveying multiple-bit parallel digital signals, or signal paths for conveying analog signals or single bit digital signals. The type of signal conveyed by a bus or signal path is made clear in the context in which it is discussed. For the sake of clarity, compensating delays may have been omitted in some signal paths. One skilled in the art of digital signal processing circuit design will know where such delays are needed in a particular system.

FIG. 1 is a block diagram of a two-channel television signal transmission system which includes an embodiment of the present invention. In FIG. 1, wideband widescreen high definition television (HDTV) signals Y, I and Q from a source 110 (e.g. a video camera) are applied to a transmitter 112. Signal Y contains luminance image information which occupies band of frequencies between 0 Hz and 20 MHz and signals I and Q contain chrominance image information occupying a band of frequencies between 0 Hz and 10 MHz.

The signals Y, I, and Q are encoded via a single channel encoder 114 of the type described in the above-referenced Isnardi et al. paper and patent application. The encoded signal is then transmitted by an antenna 115. Television signals transmitted by the antenna 115 are received by an antenna 120 associated with a standard NTSC receiver 122, and by an antenna 124 associated with a widescreen extended definition television (EDTV) display 128 in a widescreen EDTV receiver. The widescreen EDTV receiver includes a single channel decoder of the type described in the above-referenced Isnardi et al. paper and patent application for decoding the received signal into constituent extended definition luminance and chrominance image components Y', I' and Q'. The signals Y', I' and Q' are displayed on the widescreen EDTV display 128.

The system shown in FIG. 1 further includes an auxiliary channel encoder 142 which encodes, for transmission, a signal representing the difference between the widescreen EDTV signals, as displayed by the widescreen EDTV receivers 125 and 128, and the original widescreen HDTV signals provided by the source 110. This difference signal is developed by subtracting output signals Y', I' and Q' provided by a single channel decoder 140 from the respective signals Y, I, and Q provided by the source 110. The single channel decoder 140 may be identical to the decoder 125. An auxiliary television signal, provided by the encoder 142 is transmitted by an antenna 130.

The auxiliary channel signal transmitted by the antenna 130 and the main channel signal transmitted by the antenna 115 are received by an antenna 132 associated with a widescreen HDTV receiving system. This system includes a two-channel decoder 134 for decoding the main channel signal and the auxiliary channel signal, and for additively combining the decoded constituent luminance and chrominance signals to produce respective widescreen HDTV component signals Y", I" and Q" suitable for display by a widescreen HDTV display unit 136.

FIG. 1a is a diagram illustrating the signal encoding techniques used by the single channel encoder 114. The encoder first reduces the bandwidth of the HDTV signals to be less than 6.0 MHz, converts the HDTV signals from a 1050 line per frame (L/F) interlace scan format to a 525 L/F progressive scan format and then encodes the resultant signals into an NTSC compatible video signal having four component signals. One component which produces standard aspect ratio, standard definition color images in the conventional or standard NTSC television receiver 122 and three components which represent enhancements of the standard image when reproduced in the widescreen EDTV receiver 128. The three enhancement components are combined with the component corresponding to the standard aspect ratio, standard definition image such that they occupy the same band of frequencies as the standard component but are physically or perceptually hidden in the image produced by the standard television receiver 122.

Figure 2:
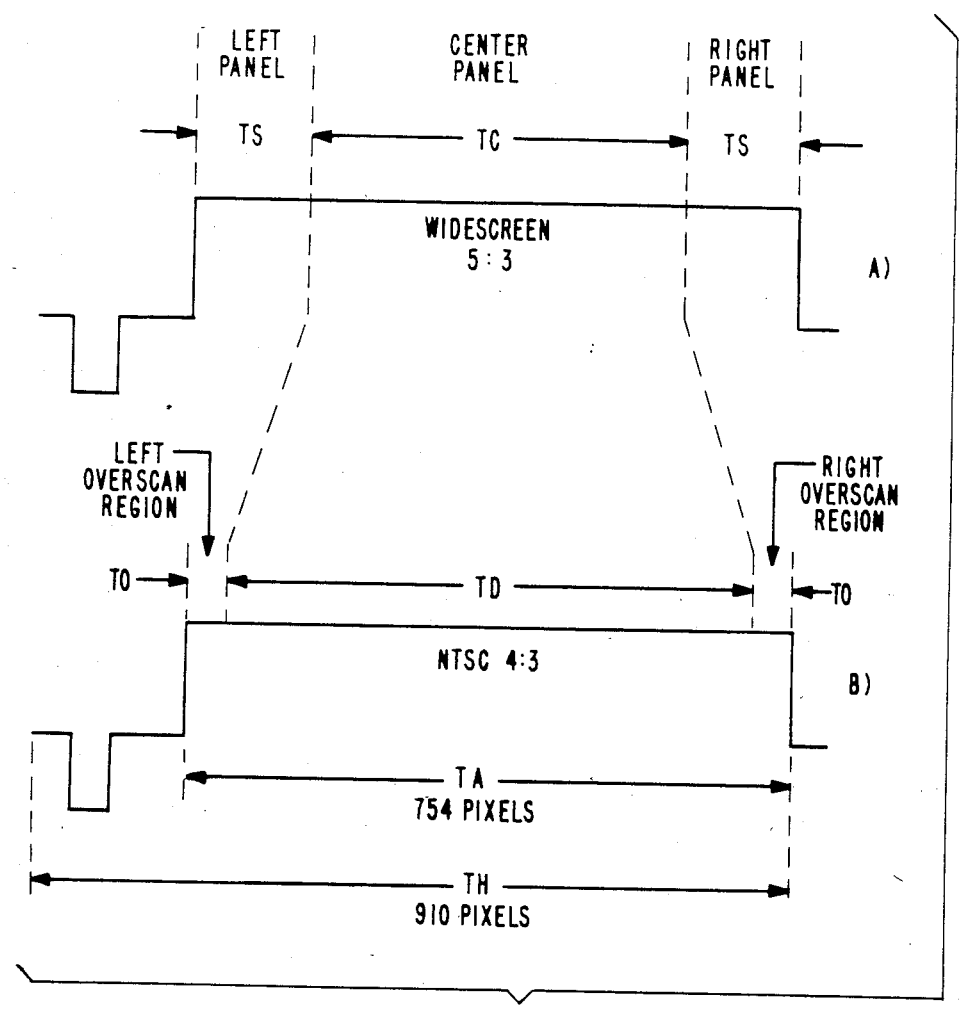

The first component signal (i.e., the standard component) is a 525 L/F, 2:1 interlaced signal with a standard 4:3 aspect ratio. This component includes the center panel of the bandlimited HDTV signal, which has been expanded in time to occupy nearly the entire active line time. The first component signal also includes side panel horizontal low frequency information that has been time-compressed into left and right horizontal image overscan regions of the display as produced by the standard NTSC receiver 122. The low frequency side panel information is physically hidden from view since it is not displayed by a standard NTSC receiver. This first component signal is intraframe averaged for frequencies above 1.5 MHz, for reasons explained below, before it is combined with the second and third component signal. FIG. 2 illustrates the time-expansion and time-compression of the first component signal.

Figure 3A:
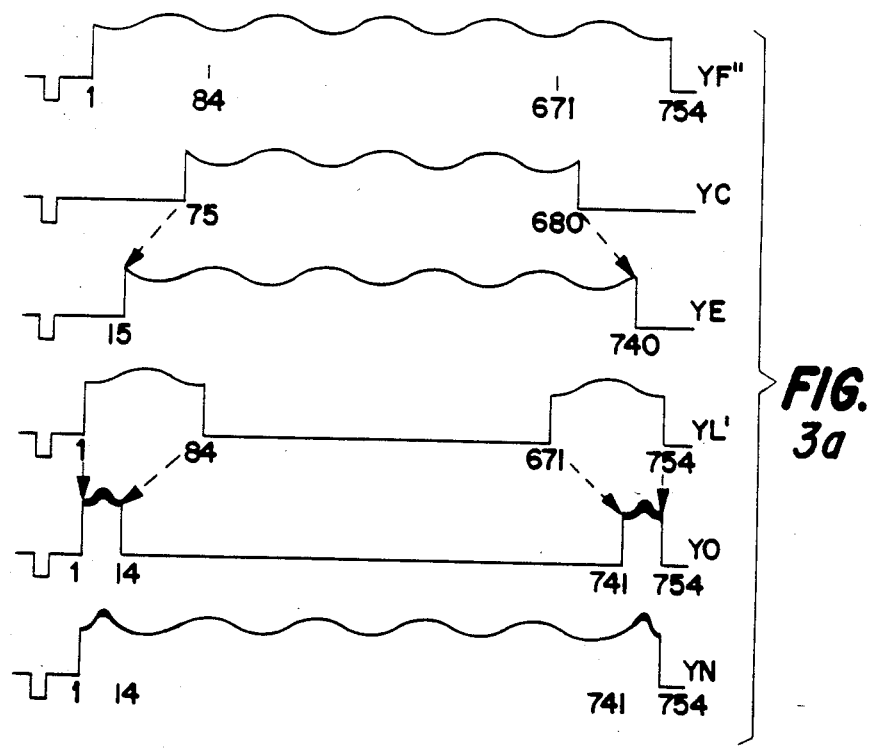
Figure 3B:
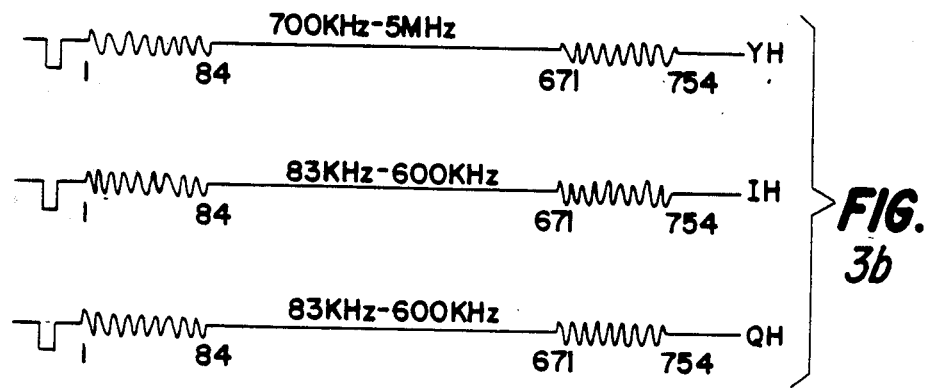
Figure 3C:
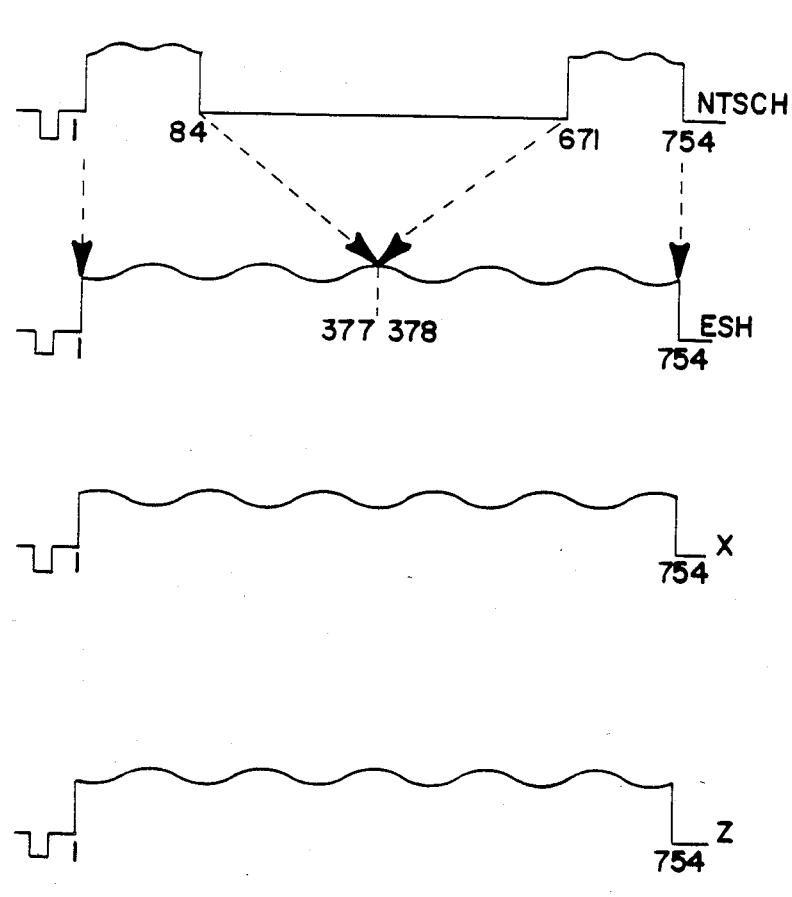

The second component signal is an auxiliary 2:1 interlaced signal in which the left and right side panel high frequency information have each been expanded to occupy one-half of the active line time. Thus, the expanded side panel information occupies substantially the entire active line time of the second component signal. FIG. 3c illustrates the generation of the second component signal.

The third component signal is an auxiliary 2:1 interlaced scan signal, derived from the bandlimited HDTV signals. It includes high frequency horizontal luminance detail information between approximately 5.0 and 6.0 MHz. This information is shifted down in frequency to occupy a band of frequencies between 0 and 1.0 MHz.

The second and third component signals are each intraframe averaged, compressed in amplitude and then used to modulate respective quadrature phase related suppressed alternate subcarrier signals ASC and ASC' which have a frequency that is an odd multiple of one-half of the horizontal line scanning frequency and that is within the chrominance band of the NTSC signal spectrum. In addition, these alternate subcarrier signals are subject to a 180° phase change from field to field, where a field is defined as 262 horizontal line periods. Consequently, any distortion of the standard NTSC image produced by the modulated second and third components appears as a frame-rate (30 Hz) complementary color change. Distortion of this type is generally not noticed since the human eye is relatively insensitive to rapid, mutually complementary changes in color at saturation levels normally encountered in television signals.

Figure 2A:
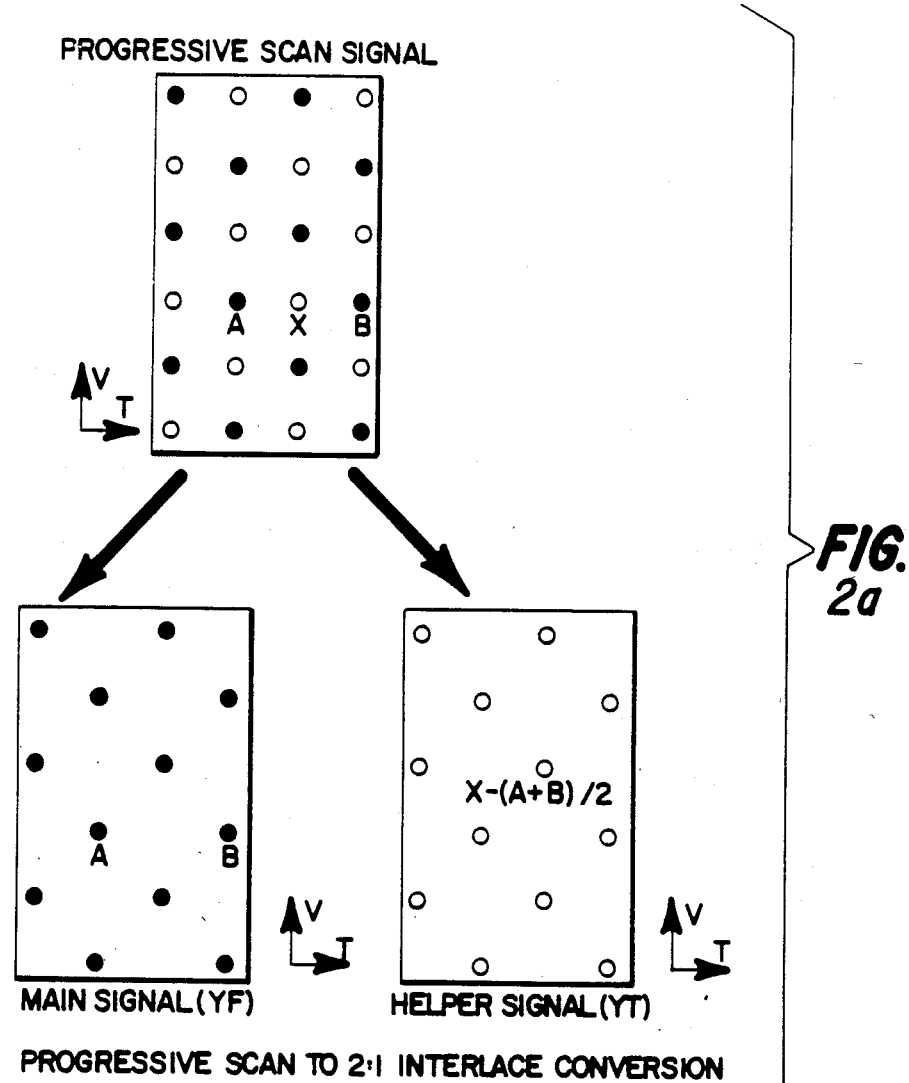

The fourth component signal is a 2:1 interlaced "helper" signal which includes vertical-temporal (V-T) luminance detail information that would otherwise be lost in the conversion of the HDTV signal from 525 LPF progressive scan to 525 LPF interlace scan. This signal helps the EDTV receiver reconstruct missing information in moving scenes and to reduce or eliminate unwanted flicker and motion artifacts in the progressively scanned widescreen image produced on the EDTV display 128 and HDTV display 136. FIG. 2a illustrates how the helper signal is generated from the 525 LPF progressive scan and 525 LPF interlace scan signals.

The fourth component signal is bandlimited to 750 KHz, mapped onto the first component signal by compressing portions which correspond to the side panels and expanding portions which correspond to the center panel. The resultant signal is used to modulate a carrier signal that is quadrature phase related to the picture carrier signal (also known as the video carrier signal) and combined with modulated first, second and third components. The fourth component signal is hidden in a conventional NTSC display because any distortion it may cause is spatially correlated with the first component by the mapping process.

The luminance signal portion of the first component signal is pre-filtered using a horizontal-vertical-temporal (H-V-T) comb filter to eliminate potential crosstalk between it and the chrominance signal portion of the first component signal. In addition, the first, second and third component signals are intraframe averaged using a V-T comb filter to substantially eliminate V-T crosstalk between the first component and the second and third components, allowing the second and third component signals to be easily separated in the receiver decoders 125 and 134. FIGS. 1d and 1e illustrate the intraframe averaging of the first, second and third component signals and their combination to generate the encoded NTSC signal.

While it is advantageous in the encoding and decoding processes, the comb filtering involved in the processing steps outlined above tends to reduce the diagonal resolution of the EDTV images shown on the display 128. In a frequency spectrum analysis, the luminance signal Y' produced by the single channel decoder has a conventional NTSC video frequency spectrum up to approximately 1.5 MHz and has a frequency spectrum characterized by alternating peaks and valleys between 1.5 MHz and 6.0 MHz (i.e., the frequency spectrum of a comb filtered signal). Frequencies above 6.0 MHz are absent from the signal Y'. In addition, since the helper signal, which is used to regenerate the progressive scan luminance signal from the transmitted interlace scan signal, is band limited to 750 KHz, luminance information between 750 KHz and 20 MHz may be absent during alternate line intervals of the signal Y'.

The signals I and Q, the color information signal components of the HDTV signal, are each bandlimited to 600 KHz before being split between the first and second component signals. Since these signals, as parts of the first and second component signals, are subject to V-T filtering during intraframe averaging, the reproduced signals I' and Q' exhibit a frequency spectrum of alternating peaks and valleys that is characteristic of a comb filtered signal.

As set forth above, each of the difference signals ΔY, ΔI and ΔQ are derived by subtracting the 525 L/F progressive scan signals Y', I' and Q' produced by the single channel decoder 140 from the respective 1050 L/F interlace scan signals Y, I and Q provided by the widescreen HDTV source 110. Since there is a vertical displacement between the displayed location of lines from at least one field of the interlaced scan signals Y, I and Q and the respective progressive scan signals Y', I' and Q', each of the difference signals ΔY, ΔI and ΔQ may have significant amounts of energy at relatively low frequencies.

Thus, the luminance difference signal ΔY may have energy in a frequency spectrum that ranges between 0 Hz and 20 MHz and chrominance difference signals ΔI and ΔQ, may have energy in a frequency spectrum that ranges between 0 Hz and 10 MHz. As described below, the auxiliary channel encoder 142 processes the signals ΔY, ΔI and ΔQ to produce the auxiliary video signal having a bandwidth of 6 MHz.

Figure 1B:
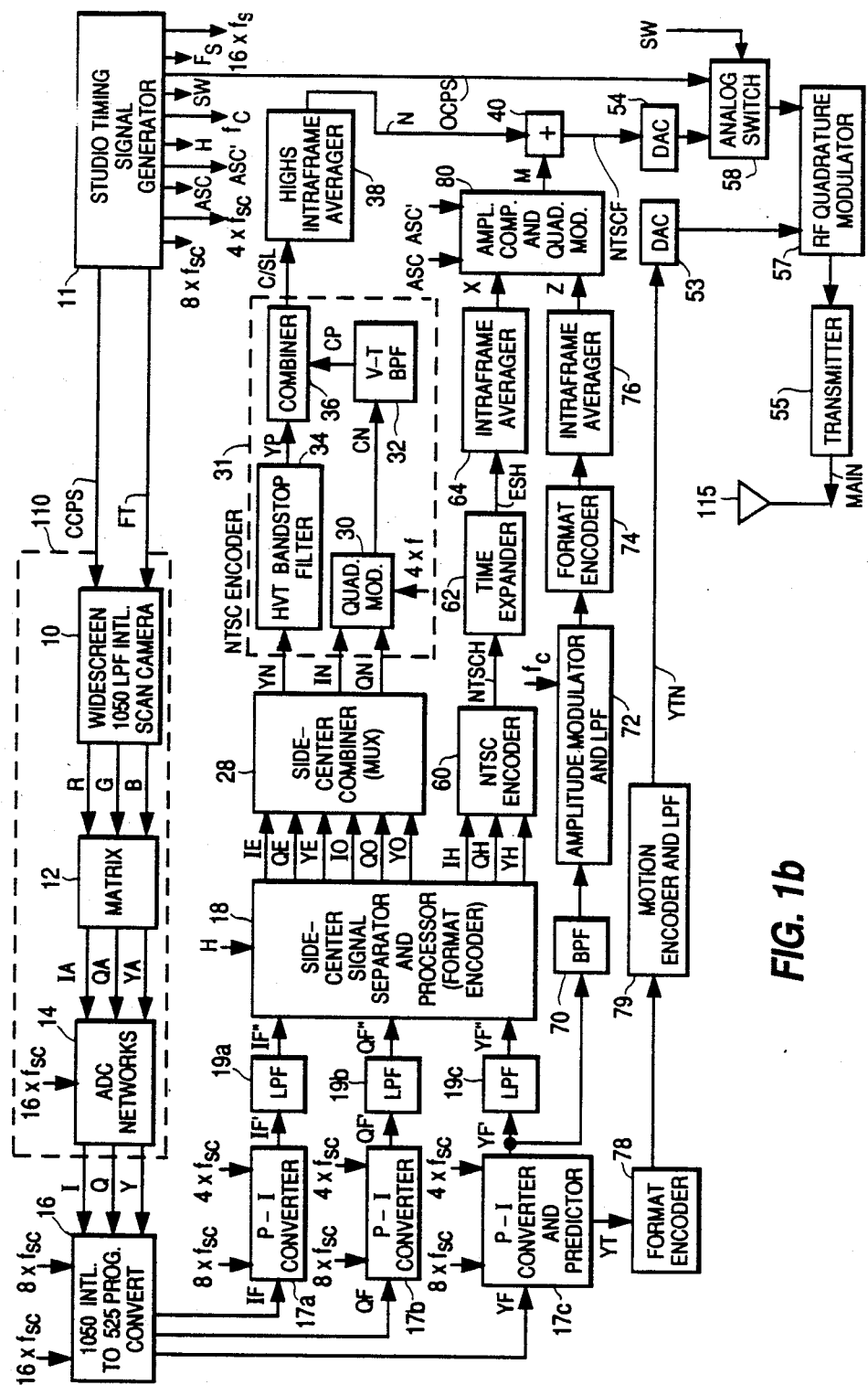
FIG. 1b is a block diagram of a single channel encoder suitable for use in the system shown in FIG. 1.
Figure 1C:
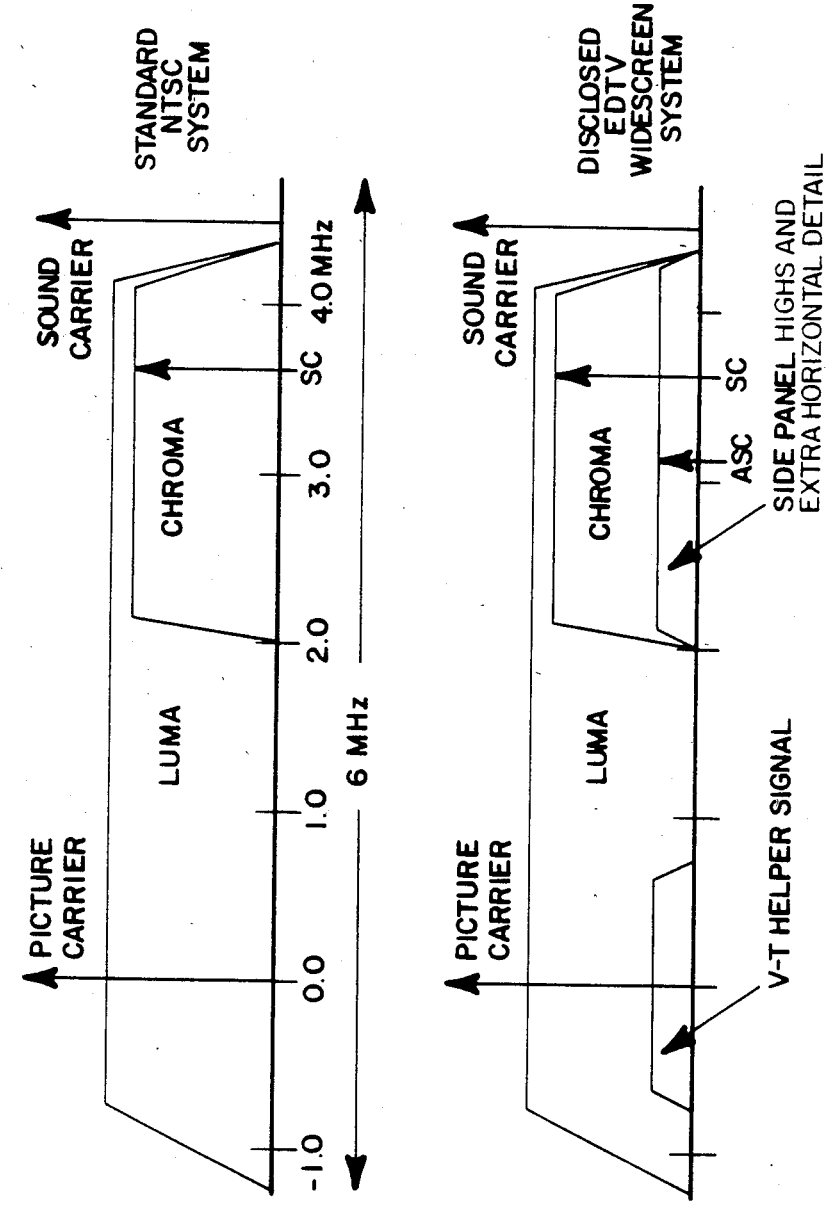
FIGS. 1c–1f, 2, 2a, and 3a–3c are diagrams illustrating the operation of various components of the single channel encoder shown in FIG. 1b.
Figure 1D:
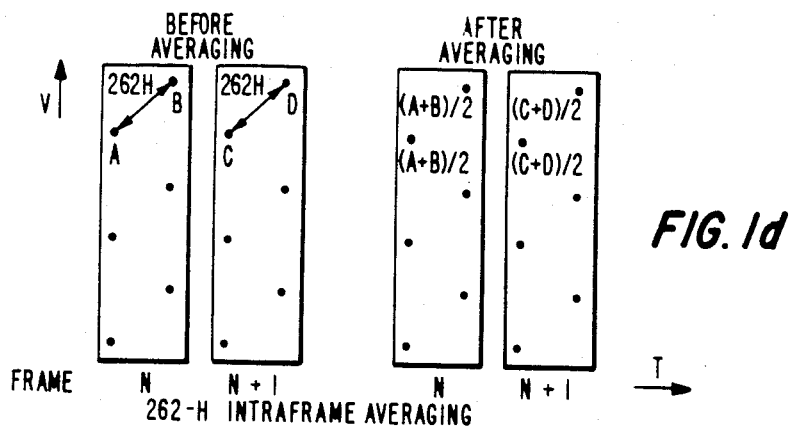
Figure 1E:
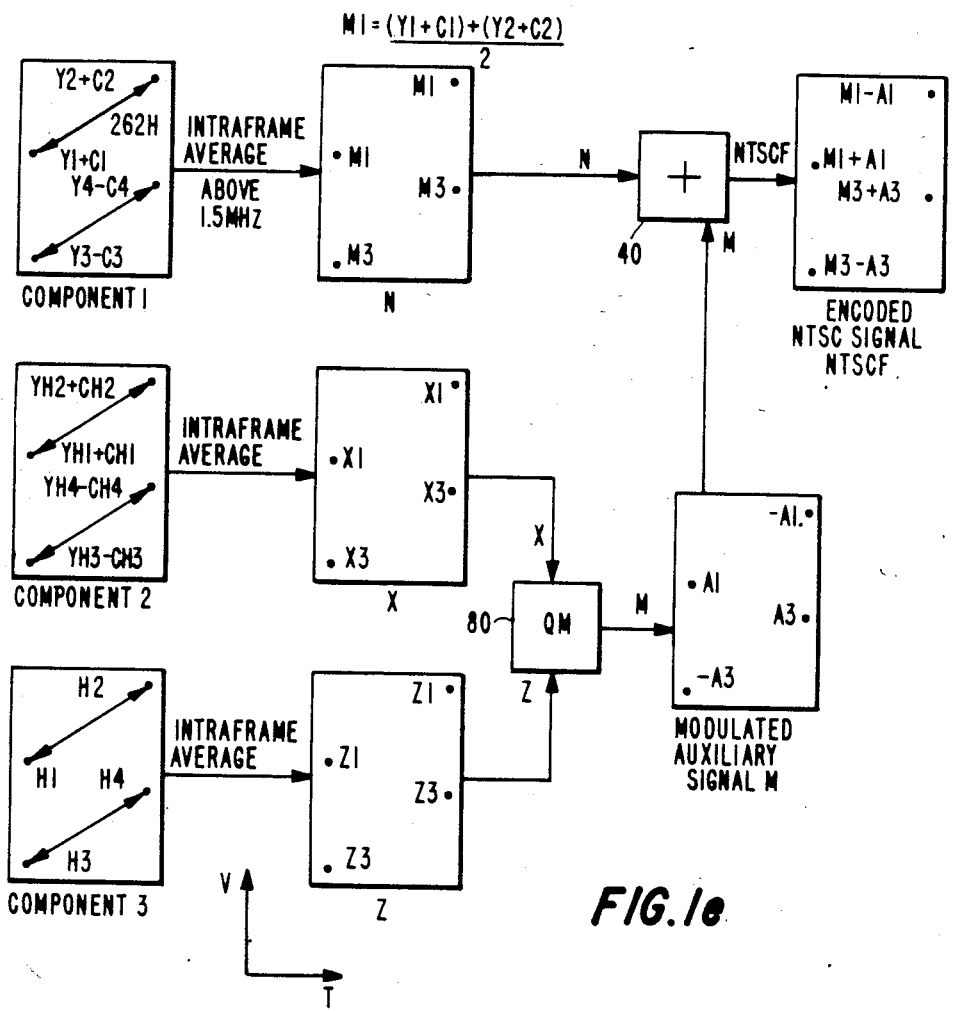

FIG. 1b is a block diagram showing details of the widescreen HDTV source 110 and the single channel signal encoder 114. The source 110 used in this embodiment of the invention includes a widescreen 1050 LPF interlace scan camera 10 which is synchronized to the encoder 114 by a composite synchronizing signal CCPS and a frame rate timing signal, FT, generated by a studio timing signal generator 11. The camera 10, used in this embodiment of the invention, produces 525 lines of video information per field or, 1050 lines per frame. In each frame, lines of one field are interleaved with lines of the next field. Although only a 1050 L/F camera source is shown, it is contemplated that a 1050 L/F video tape recorder (VTR) or an 1125 L/F interlace scan camera or VTR may also be used as a source of the video signals Y, I, and Q. When an 1125 L/F source is used it may be desirable to reduce the number of lines per frame to 1050 by cropping the 1125 L/F image or by interpolation.

The camera 10 used in this embodiment of the invention is a 525 LPF progressive scan camera which is conditioned to shift the image it provides vertically by one-half of one line space from field to field. This image shift is accomplished by applying a frame rate (30 Hz) square wave signal, FT, provided by the studio timing signal generator 11, to a centering control of the camera 10. Responsive to the signal FT having one value (e.g. logic-one), the camera 10, used in this embodiment of the invention, shifts the image down by one-half of one line period. In response to the other value of the signal FT, the camera 10 restores the image to its original unshifted position. The timing of the signal provided by the camera is not affected by the shifting of the image.

Red, green and blue (R, G, and B) primary color output signals generated by the camera 10 are applied to a matrix 12 which converts the primary color signals into a luminance signal, YA, and color difference signals, IA and QA. The signals YA, IA and QA are digitized by analog to digital converters (ADCs) 14 which are controlled by a clock signal, 8xfsc, provided by the studio timing signal generator 11. The ADCs 14 provide the widescreen HDTV signals Y, I, and Q having a sampling frequency of sixteen times the frequency, fsc, of the standard NTSC color subcarrier signal.

The following is an overview of the encoding circuitry shown in FIG. 1b. The signals Y, I, and Q are applied to a 1050 interlace to 525 progressive scan converter 16. Output signals YF, IF and QF provided by the scan converter 16 are applied to progressive to interlace scan converters 17a, 17b and 17c which produce signals YF', IF' and QF' which are each 525 LPF interlace scan signals. The scan converter 17c also produces a field difference signal, YT, which is used to develop the helper signal. As set forth above, the helper signal is used by the single channel decoders 128 and 140 to generate 525 L/F progressive scan signals Y', I' and Q' from the received 525 L/F interlaced scan signals. The signals YF', IF' and QF' are low pass filtered and applied to a side-center signal separator and processor 18 which separates the signals into respective side and center panel portions, separates the side panel portions into high and low frequency components, compresses the low frequency components of the side panel signals and expands the center panel signals. Signals representing the expanded center panel, YE, IE and QE, and signals representing the compressed low frequency components of the side panels, YO, IO, and QO, are combined by a side-center combiner 28 to generate signals YN, IN and QN. These signals are applied to an NTSC encoder 31, the output of which is the first component signal, C/SL, of the single channel EDTV signal described above.

The high frequency components of the side panels, YH, IH and QH, provided by the separator and processor 18 are applied to an NTSC encoder 60, the output signal of which is expanded in time by the circuitry 62. The output signal of the circuitry 62 is the second component signal, ESH, of the single channel EDTV signal described above.

The signal YF' provided by the progressive to interlace scan converter 17c is band-pass filtered to between 5.0 MHz and 6.0 MHz by a filter 70, shifted in frequency to 0 MHz to 1.0 MHz by a modulator and low-pass filter 72 and compressed in time to coincide with the center panel portion of the first component signal by the format encoder 74. The output signal of the encoder 74 is the third component of the EDTV signal.

The second and third component signals are intraframe averaged by respective circuits 64 and 76 to produce signals X and Z. The signals X and Z are compressed in amplitude and used, by circuitry 80, to modulate two quadrature phase related subcarrier signals, ASC and ASC'. The output signal of the circuitry 80 is a signal M. The first component signal, C/SL, is intraframe averaged by circuitry 38 to produce a signal N. Signals M and N are combined by an adder 40 to generate the signal NTSCF.

The field difference signal, YT, developed by the progressive to interlace scan converter 17c is mapped in time, by a format encoder 78, to have a format which corresponds to the first component signal. The resulting signal is applied to a motion encoder and low-pass filter 79 to generate the fourth component or helper signal, YTN.

The signals NTSCF and YTN are converted to analog form by respective digital to analog converters (DACs) 54 and 53. An analog switch 58 adds a composite synchronization signal, OCPS, generated by the studio timing signal generator 11, to the signal NTSCF. The signal provided by the switch 58 and the analog helper signal are applied to a radio frequency (RF) quadrature modulator 57 which develops the first component television signal. This signal is transmitted via the antenna 115 by a transmitter 55.

The following is a more detailed description of the circuitry shown in FIG. 1b. A studio timing signal generator 11 provides composite synchronization signals CCPS and OCPS for the 1050 LPF interlace scan camera 10 and for the 525 LPF interlace scan encoded output signal, MAIN. In addition, the generator 11 provides clock signals 4xfsc, 8xfsc and 16xfsc having respective frequencies of four, eight and sixteen times the frequency of the NTSC color subcarrier signal, sampled data oscillatory signals ASC, ASC' and fc, line rate signals Fs and H, and a frame rate signal FT. A switching signal SW is provided to control the insertion of the signal OCPS into the encoded output signal MAIN. The circuitry 11 includes a conventional resonant crystal controlled oscillator which generates the clock signal 16xfsc. The circuitry 11 generates, from the signal 16xfsc, quadrature phase related alternate subcarrier signals, ASC and ASC', having a frequency, 3.1 MHz, substantially equal to 395 times one-half the horizontal line scanning frequency, and a signal fc having a frequency substantially equal to 5 MHz. The signals ASC, ASC' and fc may be generated, for example by incrementing a counter (not shown) with the signal 16xfsc and applying the counter value to a read only memory (ROM) (not shown) that is programmed to provide sample values representing the three signals. In addition, the ROM may provide an output signal indicative of a predetermined pixel sampling time (H) or group of sampling times (Fs) on each horizontal line interval of the signal NTSCF. One of these signals may be applied to a further counter (not shown) which is programmed to provide signals, such as the signal FT described below in reference to FIGS. 11a and 11b, which occur at a frame or field rate. Exemplary apparatus for generating the various clock and timing signals is described in greater detail in a U.S. patent application Ser. No. 241,277 entitled "Video Signal Synchronization System as for an Extended Definition Television System" and hereby incorporated by reference.

Figure 4:
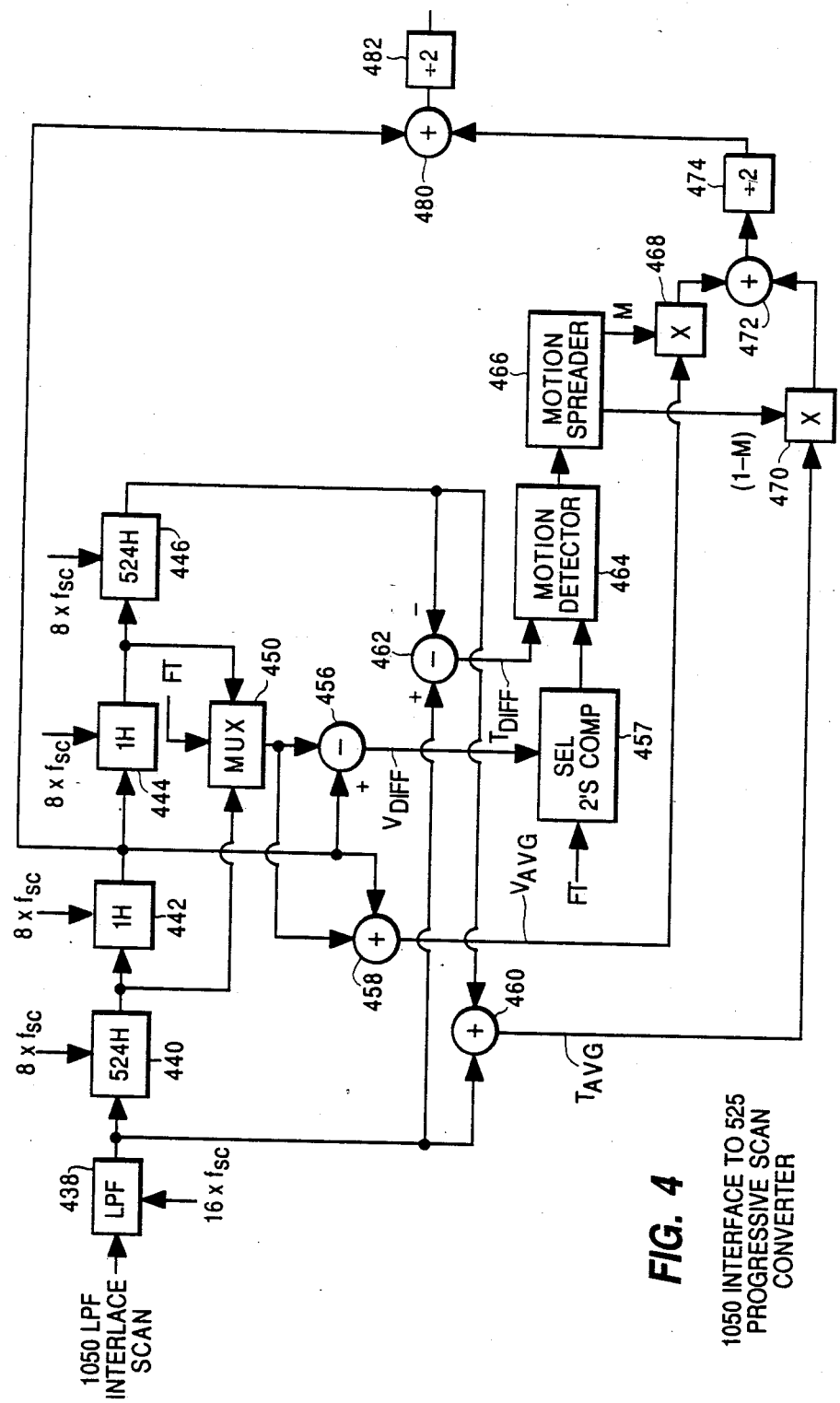
FIG. 4 is a block diagram of a 1050 line per frame (L/F) interlace to 525 L/F progressive scan converter suitable for use in the single channel encoder shown in FIG. 1b.

The widescreen HDTV signals Y, I and Q, provided by the source 110, are applied to a 1050 interlace to 525 progressive scan converter 16 which produces signals YF, IF and QF. The scan converter 16 is part of the single channel encoder 114. FIG. 4 is a block diagram showing circuitry suitable for use in the scan converter 16. The circuitry shown in FIG. 4 represents one of three channels (for Y, I, and Q, respectively) of the scan converter 16. The other two channels (not shown) may be identical to the one shown and are not described in detail. This circuitry interpolates sample values interstitial to the samples of the 1050 LPF interlace input signal and combines these interpolated samples with uninterpolated samples to generate a 525 LPF progressive scan signal at the output port of a divide-by-two circuitry 482. The interpolated samples developed by the scan converter 16 are derived by motion adaptive processing. In areas of the image which represent motion, the interpolated samples are developed from samples separated by one horizontal line interval (i.e. vertically averaged). In areas of the image that are still, the interpolated samples are developed from samples separated by one frame interval (i.e. temporally averaged).

In FIG. 4 the 1050 LPF interlace scan signal is applied to a horizontal low-pass filter 438. The filter 438 may average successive samples of the 16xfsc signals Y, I and Q to produce samples which may be subsampled by the signal 8xfsc without aliasing distortion. The signal produced by the filter 438 is applied to a 524 horizontal line period (524 H) delay element 440 which is the first of four serially connected delay elements. The other three delay elements, 442, 444, and 446 provide respective signal delays of 1 H, 1 H, and 524 H. The output signal of the delay element 442 is a reference signal. The output signals of the delay elements 440 and 444 are respectively advanced and delayed by 1 H relative to the reference signal. The input signal to the scan converter and the output signal of the delay element 446 are respectively advanced and delayed by one field period of the 1050 LPF interlace scan signal relative to the reference signal.

The output signals of the delay elements 440 and 444 are applied to respective input ports of a multiplexer 450. The multiplexer 450 is conditioned by the signal FT provided by the studio timing signal generator 11 to alternately provide the signal from the delay element 440 and the signal from the delay element 444 during successive field intervals of the signal provided by the camera 10. The signal produced by the multiplexer 450 is combined with the reference signal, provided by the delay element 442, by an adder 458 and a subtracter 456. The output signal of the adder 458 is a vertical average signal VAVG and the output signal of the subtracter 456 is a vertical difference signal VDIFF. The signals VAVG and VDIFF represent respective additive and subtractive combinations of the reference signal, which is delayed by 525 H with respect to the input signal, and a signal which is alternately delayed by 524 H and 526 H with respect to the input signal. The switching of the signal to be combined with the reference signal is controlled by the signal FT to track the shifting of the image by the camera 10.

The input signal to the scan converter and the output signal of the delay element 446 are combined in an adder 460 and in a subtracter 462 to generate a temporal average signal TAVG and a temporal difference signal TDIFF, respectively. The temporal average signal, TAVG, and the temporal difference signal, TDIFF, always represent combinations of signals that are separated by 1050 H, one frame interval.

The signals VDIFF and TDIFF are applied to a conventional motion detector 464, the output signal of which is applied to a conventional motion spreader 466. The detector 464 may include, for example, a comparator (not shown) which compares the relative magnitudes of the respective temporal difference and vertical difference signals, TDIFF and VDIFF. In addition, the detector 464 may include a horizontal low pass filter (not shown). The motion spreader 466 may include circuitry (not shown) which thresholds the motion signal provided by the detector 464 and averages the thresholded signal in the horizontal, vertical and temporal directions to spread the boundaries of areas of the image which contain motion into areas that contain no motion. The motion signal is spread to mitigate any boundary effects in any motion adaptive processing which uses the motion signal. In general, treating a still area as a moving area creates fewer artifacts than treating a moving area as a still one.

The motion spreader 466 provides motion indicative signals M and (1−M) which are applied to respective multipliers 468 and 470. The multipliers 468 and 470 are configured to scale the respective signals VAVG and TAVG by these motion indicative signals. The output signals provided by the multipliers 468 and 470 are summed by an adder 472 to generate the interpolated signal.

The signals M and (1−M) are mutually supplementary fractional values. The magnitude of M is directly proportional to the level of interfield motion among the video images represented by the reference signal and the field advanced and field delayed signals. Thus, when there is a high level of interfield motion in a portion of the displayed image, the interpolated signal for that portion has a relatively large component derived from the vertical average signal VAVG and only a small component derived from the temporal average signal TAVG. In relatively still areas of the image, i.e. where the level of interfield motion is low, these proportions are reversed.

The switching between a vertical average and a temporal average in the presence or absence of interfield motion produces interpolated signals having full temporal resolution in moving portions of an image and full vertical resolution in still portions of the image. The inventors have determined that this type of motion adaptive processing produces better results than either pure temporal or pure vertical interpolation.

The output signal of the adder 472 is scaled by a factor of one-half in a divide-by-two circuit 474 to produce a digital signal which occupies the same range of amplitude values as the signal applied to the scan converter 16. The output signal provided by the divide-by-two circuit 474 and the reference signal provided by the delay element 442 are applied to respective input ports of an adder 480, the output port of which is coupled to the input port of a divide-by-two circuit 482. The adder 480 and divide-by-two circuit 482 form the average of sample values provided by the camera 10 and interpolated sample values which represent lines interstitial to the 1050 LPF interlace scan image. Thus, the output signal provided by the circuit 482 may be thought of as an average of pairs of successive lines of a 1050 LPF progressive scan signal. The inventors have determined that this is a good approximation of a 525 LPF progressive scan signal.

Referring to FIG. 1b, the 525 LPF progressive scan signals IF, QF and YF provided by the scan converter 16 are applied to respectively different progressive scan to interlace scan converters 17a, 17b and 17c. Circuitry suitable for use as the converter 17c is shown in FIG. 5a and circuitry suitable for use as either of the converters 17a and 17b is shown in FIG. 5b.

Figure 5:
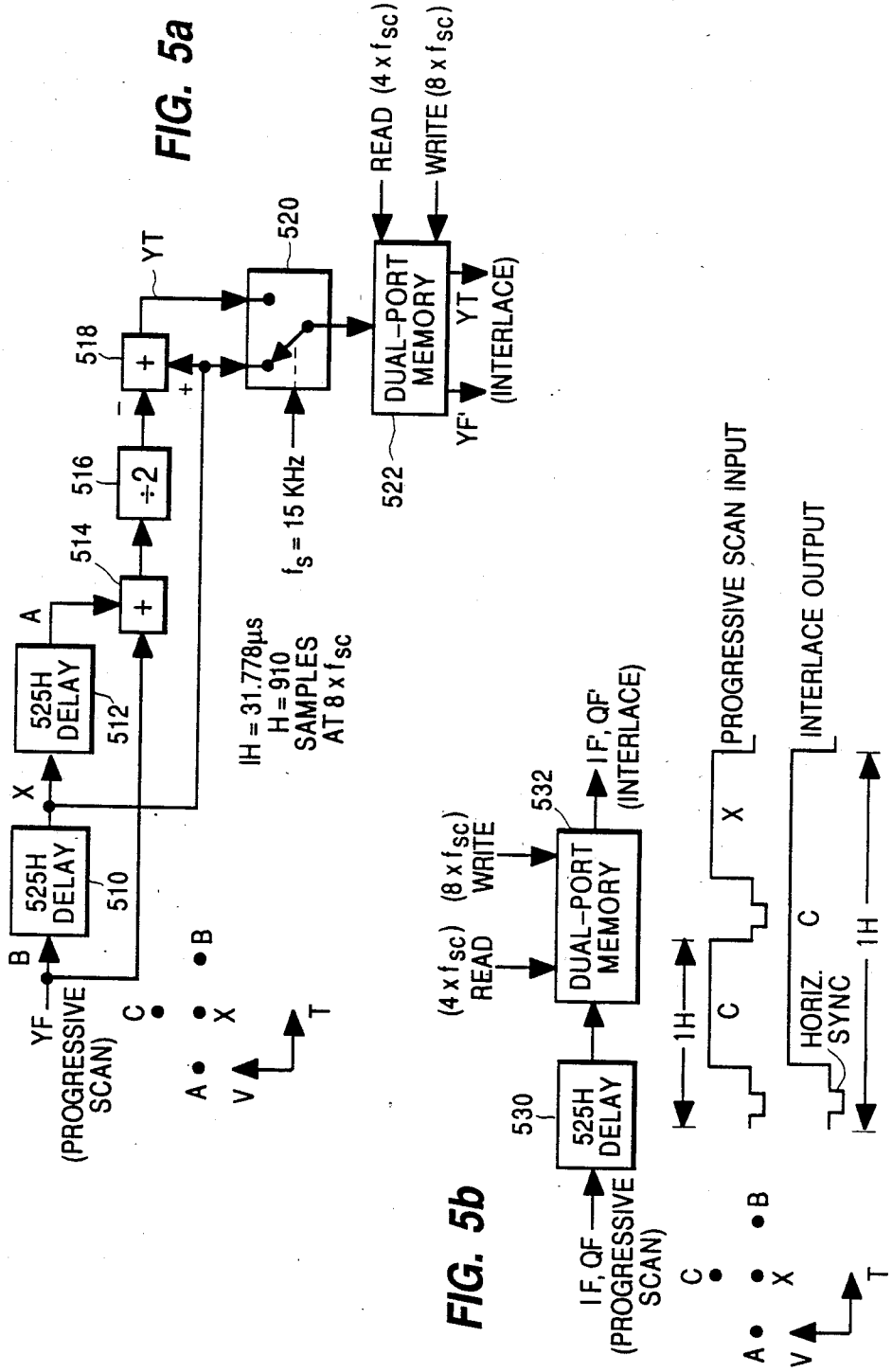
FIGS. 5a and 5b are block diagrams of progressive to interlace scan converters suitable for use in the single channel encoder shown in FIG. 1b.

The scan converter shown in FIG. 5a includes a signal averager formed by one-field (525 H) delay elements 510 and 512, an adder 514 and a divide-by-two circuit 516. The signal provided by the signal averager is the average of the input signal, YF or B, and a signal A provided by the delay element 512. These signals are separated by two field periods. This averaged signal is subtracted in a subtracter 518 from a signal X provided by the delay element 510 to produce the field difference signal YT. The signal X represents the field of video signal between the signals A and B. The signals X and YT are applied to separate poles of a switch 520. The wiper of switch 520 is controlled by a square wave signal Fs having a fifty-percent duty cycle and a frequency substantially equal to the horizontal line scanning frequency defined by the NTSC standard. The signal Fs conditions the switch 520 to alternately provide a line of samples of the signal X and a line of samples of the signal YT. These samples are written into a dual-port memory 522 responsive to the signal 8xfsc and read from the memory as signals YF′ and YT, in parallel, responsive to the signal 4xfsc which has a frequency substantially equal to four times the color subcarrier frequency. The signal YF′ is a 525 LPF interlace scan luminance signal. The signal YT is used to develop the helper signal which is described above in reference to FIG. 2a.

The scan converter shown in FIG. 5b includes a one-field compensating delay 530 and a dual-port memory 532. Delayed samples of the signals IF or QF are stored into, and read from the memory 532 responsive to the respective signals 8xfsc and 4xfsc. The output signal of the memory 532 is a 525 LPF interlace scan signal IF′ or QF′ that is in proper time relationship with the signal YF′.

Referring to FIG. 1b, the signals IF′, QF′ and YF′ provided by the respective scan converters 17a, 17b, and 17c are applied to respective low-pass filters 19a, 19b and 19c. The filters 19a and 19b reduce the horizontal bandwidth of the signals IF′ and QF′ to 500 KHz. The filter 19c reduces the horizontal bandwidth of the signal YF′ to 5 MHz. The output signals, IF″, QF″ and YF″, provided by the respective low-pass filters 19a, 19b and 19c are applied to a side-center signal separator and processor 18. Details of the processor 18 are shown in FIGS. 6, 7 and 8.

Figure 6:
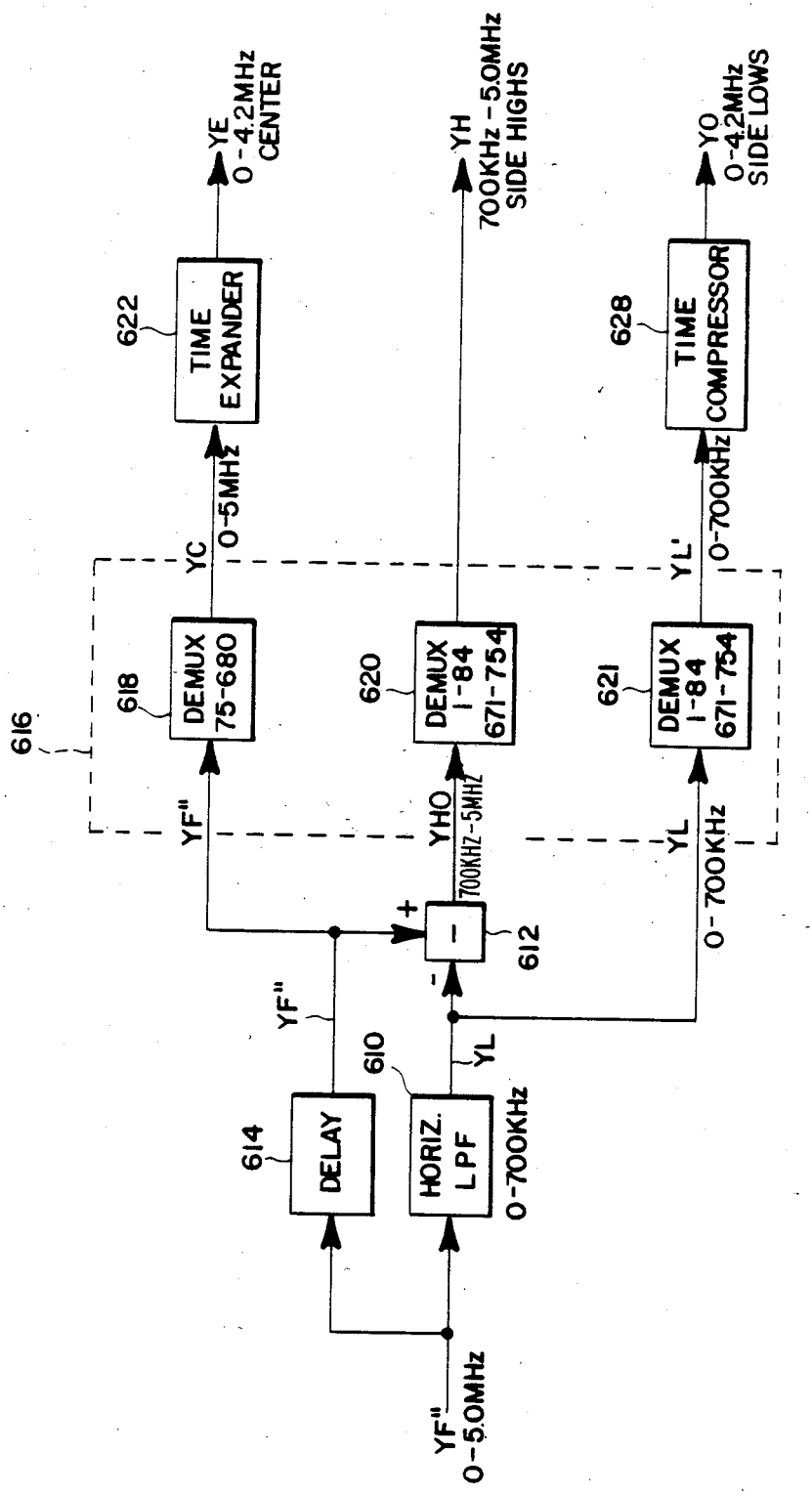
FIGS. 6–8 are block diagrams of circuitry suitable for use as the side-center signal separator and processor of the single signal encoder shown in FIG. 1b.

FIG. 6 is a block diagram of a portion of the processor 18 which separates the luminance signal YF″ into a signal YE representing time expanded center panel pixels, a signal YO representing time compressed side panel pixels, and a signal YH representing high frequency components of the side panel pixels. The signals YE and YO are used to form the first component of the encoded EDTV signal and the signal YH is used to form the second component signal.

In FIG. 6, a low-pass filter 610 filters the signal YF″ to provide a signal YL which occupies a band of frequencies between 0 Hz and 700 KHz. The signal YL is subtracted from a delayed signal YF″ by a subtracter 612 to generate a signal YHO which occupies a band of frequencies between 700 KHz and 5 MHz. The delayed signal YF″, the signal YHO and the signal YL are applied to demultiplexing circuitry 616. The circuitry 616, which is described below in reference to FIG. 8, passes the portion of the signal YF″ corresponding to the center panel of the image as a signal YC and the portions of the signals YHO and YL corresponding to the side panel portions of the image as the respective signals YH and YL′. The signal YC is expanded in time, as illustrated in FIG. 2, by time expander circuitry 622 to provide a signal YE which has a bandwidth of 4.2 MHz. The signal YL′ is compressed in time, also as illustrated in FIG. 2, by circuitry 628 to provide a signal YO which has a bandwidth of 4.2 MHz. The time expander 622 and the time compressor 628 may be realized by circuitry described below in reference to FIGS. 12 and 12a through 12d.

Figure 7:
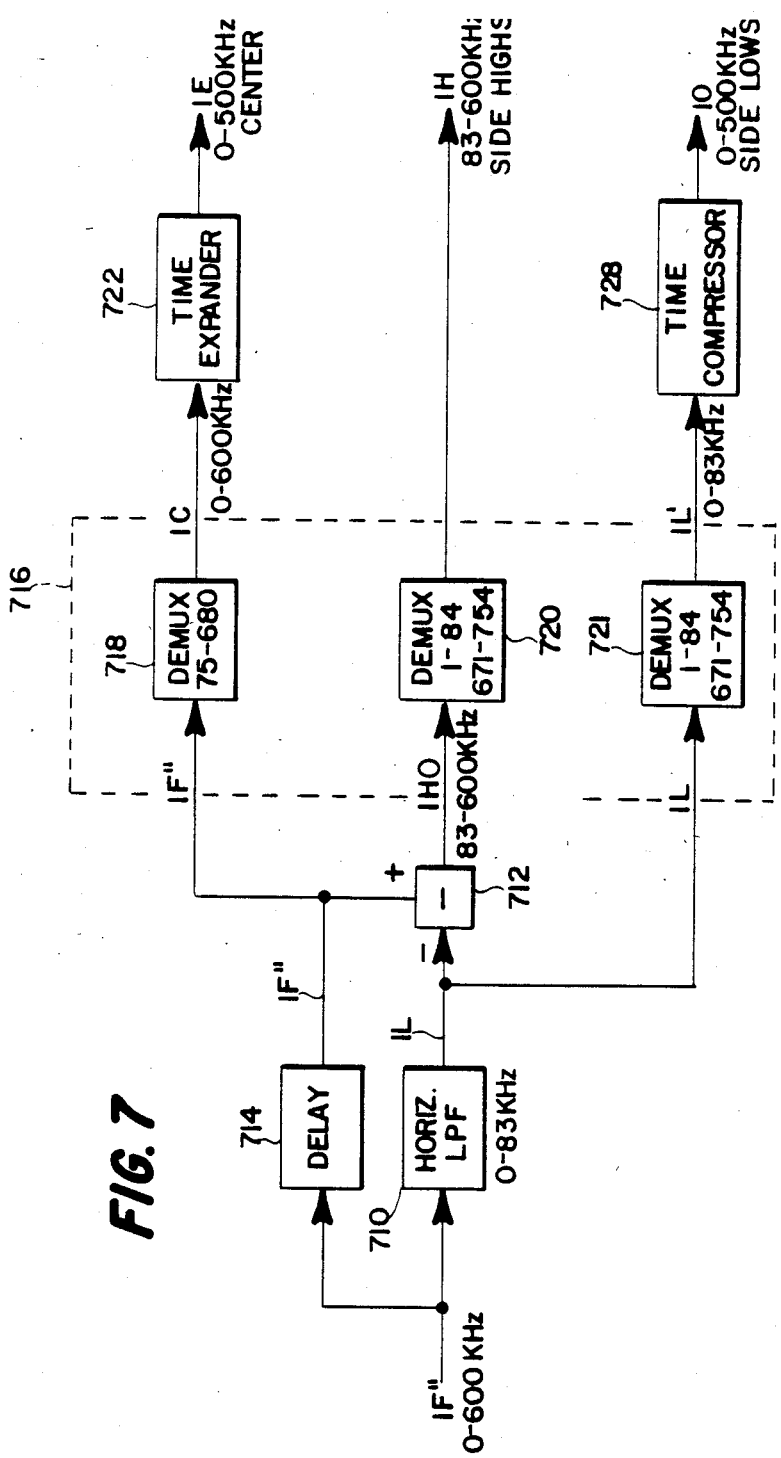
Figure 8:
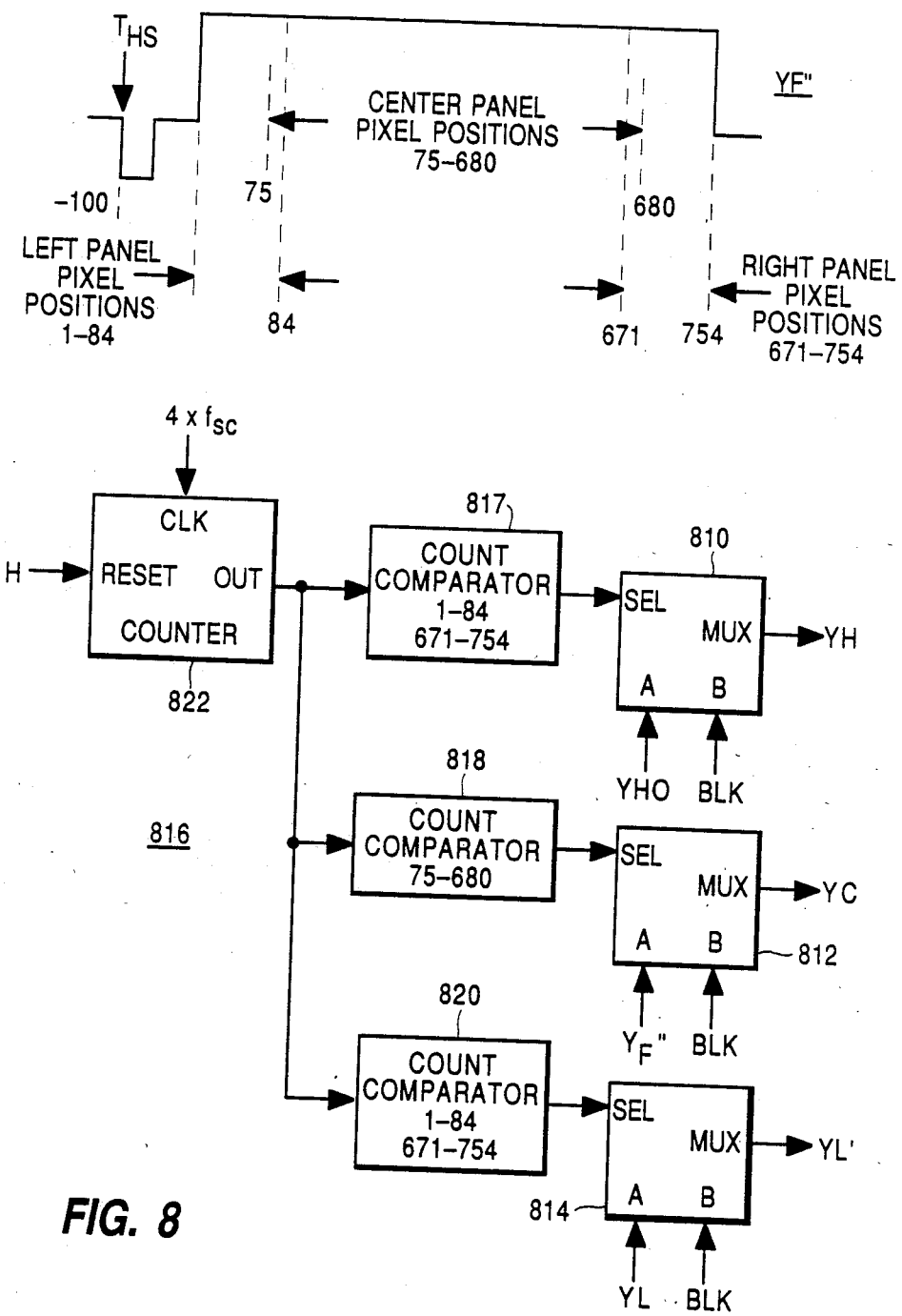

The circuitry shown in FIG. 7 is identical to that shown in FIG. 6 except that the pass-band of the low-pass filter 710 is from 0 Hz to 83 KHz instead of from 0 Hz to 700 KHz for the filter 610 of FIG. 6 to which it corresponds.

FIG. 8 is a block diagram of demultiplexing circuitry which may be used as the demultiplexer 716 of FIG. 7 or, as illustrated, the demultiplexer 616 of FIG. 6. The circuitry shown in FIG. 8 includes three multiplexers 810, 812, and 814, each of which is coupled to a respective count comparator circuit 817, 818, and 820. Each of these count comparator circuits is coupled to receive a count value from a counter 822. The counter 822 is clocked by the signal 4xfsc. The counter 822 is reset by a signal H, provided by the studio timing signal generator 11, which occurs once per horizontal line period to indicate the position of the first image sample on each line.

In response to count values from 1 to 84 and from 671 to 754, the count comparators 817 and 820 condition the respective multiplexers 810 and 814 to pass the signals YHO and YL, respectively. The multiplexers 810 and 814 pass a blanking signal, BLK, in response to all other count values. In the same manner, the count comparator 818 conditions the multiplexer 812 to pass the signal YF" for count values between 75 and 680 and to pass the blanking signal otherwise. The center and side panel pixels are overlapped by, for example, ten samples as illustrated in the waveform diagram of FIG. 8 to aid in the reconstruction of the widescreen EDTV signal at the decoder (described below).

Figure 12:
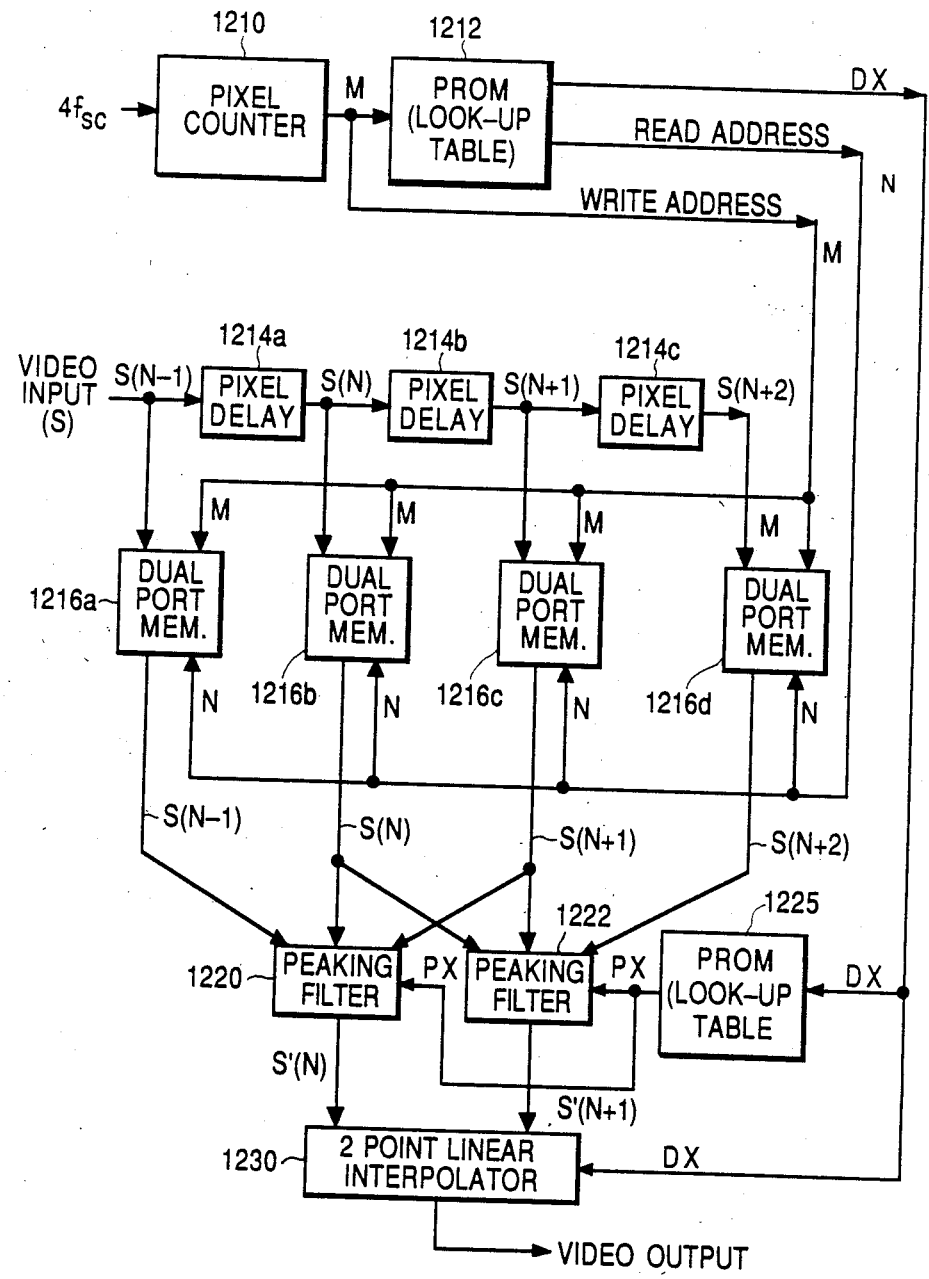
FIGS. 12 and 12a–12d are block diagrams of circuitry suitable for use as any of the time expanders or time compressors used in the single channel encoder shown in FIG. 1b and diagrams illustrating the operation of the circuitry.
Figure 12A:
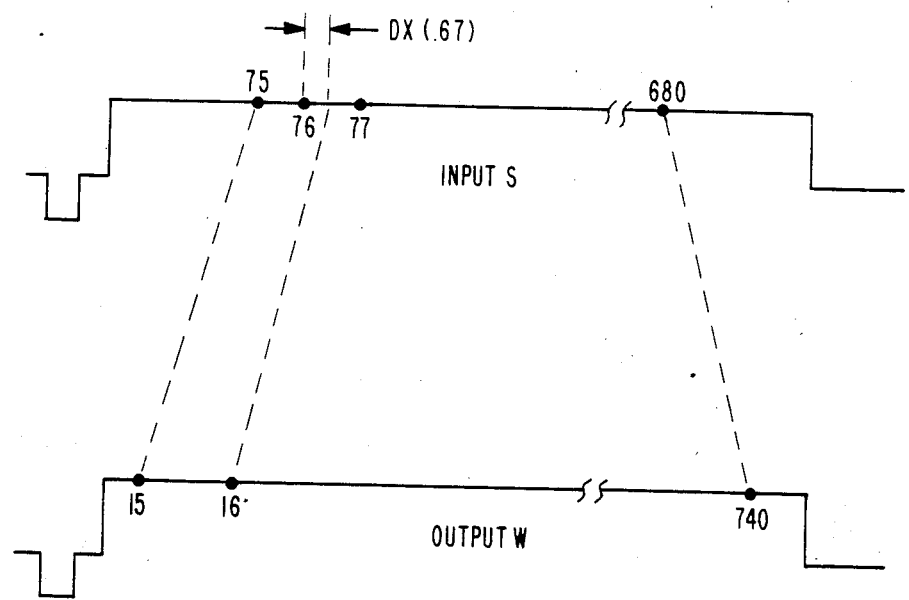

As set forth above, the time expanders 622 and 722 and the time compressors 628 and 728 may be realized by circuitry such as that shown in FIG. 12. The circuitry shown in FIG. 12 utilizes four dual port memories 1216a through 1216d to time expand (by repeating samples) or time compress (by deleting samples) a sequence of pixel values. The circuitry shown in FIG. 12 further includes a pair of peaking filters 1220 and 1222 to amplify the high frequency components of the signals provided by the dual port memories and a two point linear interpolator 1230 to combine the peaked signals to develop the time expanded or time compressed video signals. The peaking filters 1220 and 1222 compensate for the low-pass filtering which is inherent in the two-point linear interpolation. A pixel counter 1210 and two programmable read only memories (PROMs) 1212 and 1225 control the circuitry shown in FIG. 12. By appropriate programming of the PROMS 1212 and 1225, the circuitry in FIG. 12 may be used to realize a variety of expansion and compression factors.

In operation, a video input signal, S, which may be, for example, the signal YC provided by the demultiplexer 616 of FIG. 6, is applied to the dual-port memory 1216a and to three serially connected delay elements 1214a, 1214b and 1214c. The output signals of the delay elements 1214a, 1214b and 1214c are applied to input ports of the respective dual port memories 1216b, 1216c and 1216d. A write address signal, M, for the memories 1216a-1216d is provided by the pixel counter 1210. The signal M is also applied to the PROM 1212 which generates a read address signal, N, for the memories 1216a-1216d and an interpolation factor DX which is applied to the two-point linear interpolator 1230 and to the PROM 1225. If the circuitry shown in FIG. 12 is used to time-expand a signal, the PROM 1212 is programmed to produce the read address signal, N, which increases in value more slowly than the signal M. This causes the memories 1216a-1216d to repeat sample values. If, on the other hand, the circuitry is used to time-compress a signal, the read address signal N increases in value at a rate greater than the signal M. This causes the memories 1216a-1216d to skip over sample values. The PROM 1225 may be programmed, as illustrated in FIG. 12d to change the peaking factor, PX, applied to the peaking filters 1220 and 1222 in response to different interpolation factors.

Figure 12B:
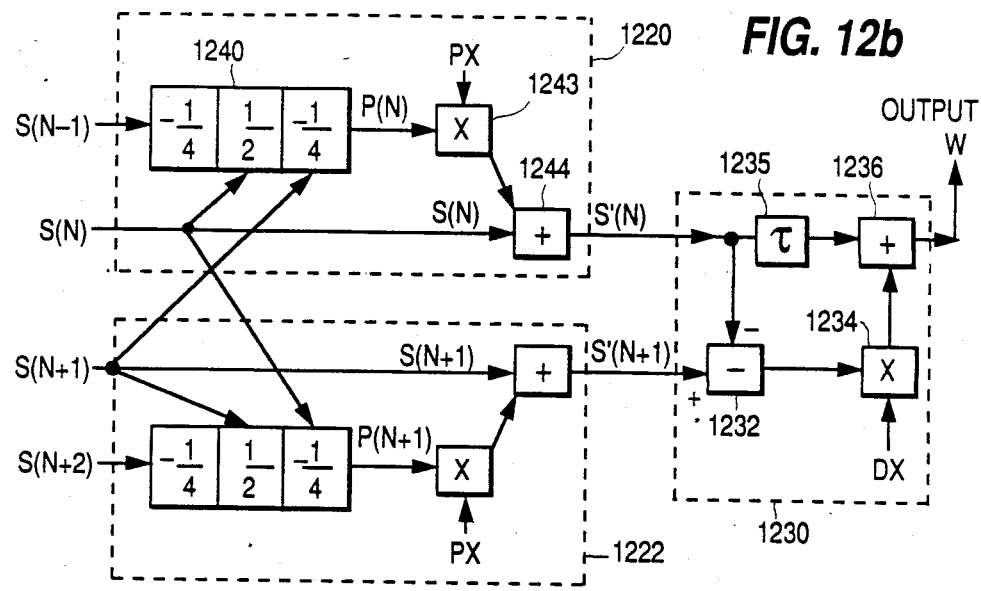
Figure 12C:
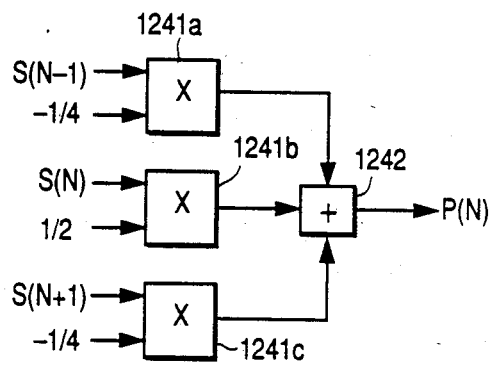
Figure 12D:
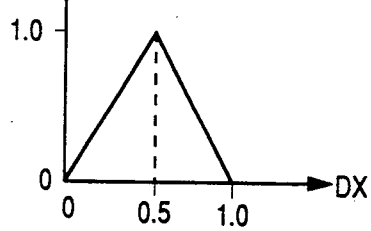

FIG. 12b shows details of the peaking filters 1220 and 1222 and of the two-point linear interpolator 1230. FIG. 12c shows details of a high-pass filter 1240 used in the peaking filter 1220, an identical filter is used in the peaking filter 1222.

Referring to FIG. 1b, the separated and time-expanded center panel signals IE, QE, and YE and the separated and time-compressed side panel signals IO, QO and YO provided by the processor 18 are applied to a side-center combiner 28. The combiner 28 may include a counter (not shown) which is reset by the signal H and which is clocked by the signal 4xfsc. The count value signal produced by this counter is applied to a multiplexer (not shown) which combines the signals YE and YO as illustrated in FIG. 3a to generate an output signal YN. The combiner 28 includes circuitry (not shown) of the same type to combine the signals IE and IO to generate the signal IN, and to combine the signals QE and QO to generate the signal QN.

The signals YN, IN and QN provided by the combiner 28 are applied to an NTSC encoder 31. The encoder 31 includes a horizontal-vertical-temporal (HVT) filter 34 which processes the signal YN through a comb filter transfer function that removes spectral components of the luminance signal which may be confounded with the modulated color subcarrier signal and the modulated alternate subcarrier signal. The output signal of the HVT filter 34 is a signal YP. The color difference signals, IN and QN are applied to a quadrature modulator 30 which, responsive to the clock signal 4xfsc, develops an NTSC chrominance signal, CN. The signal CN is applied to a vertical-temporal (VT) filter 32 which comb filters the signal CN to remove spectral components corresponding to the modulated alternate subcarrier and to high-frequency luminance signals. The output signal of the filter 32 is a signal CP. The signals CP and YP are additively combined by a signal combiner 36 to generate a signal C/SL, the first component signal of the encoded EDTV signal.

Figure 9:
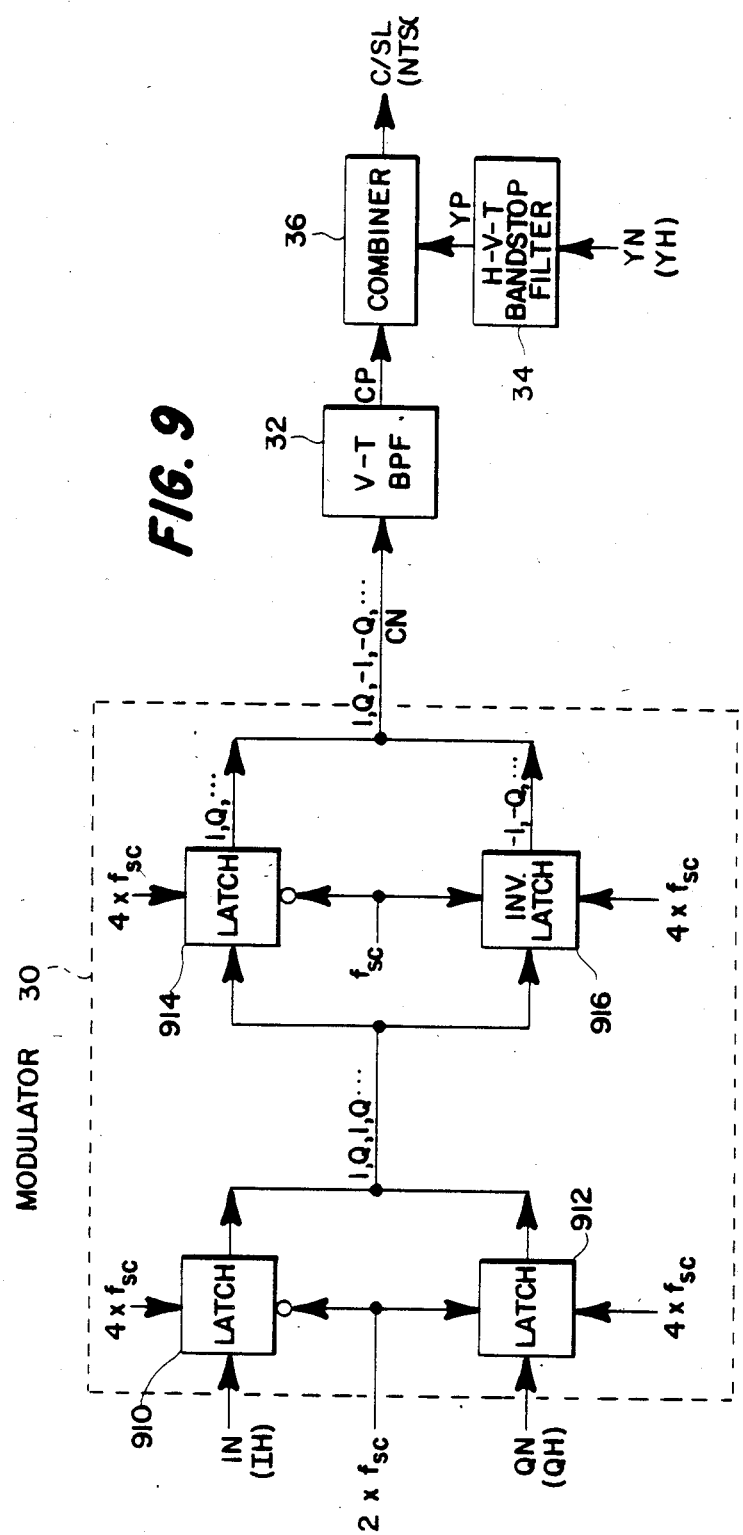
FIG. 9 is a block diagram of circuitry suitable for use as the NTSC encoder of the single channel encoder shown in FIG. 1b.

FIG. 9 is a block diagram showing additional details of the NTSC encoder 31. In FIG. 9, a pair of latches 910 and 912 are responsive to the clock signals 2xfsc and 4xfsc to time division multiplex the signals IN and QN into a signal which alternates I and Q samples. The circle at the input of the latch 910 indicates that it is responsive to the inverse of the clock signal 2xfsc. The signal provided by the latches 910 and 912 is applied to a second pair of latches 914 and 916 which change the polarity of alternate pairs of samples, as indicated in the FIG. 9 to produce the signal CN. The signal CN is applied to the VT bandpass filter 32. The signals 4xfsc, 2xfsc and fsc are provided by the studio timing signal generator 11.

Figure 10:
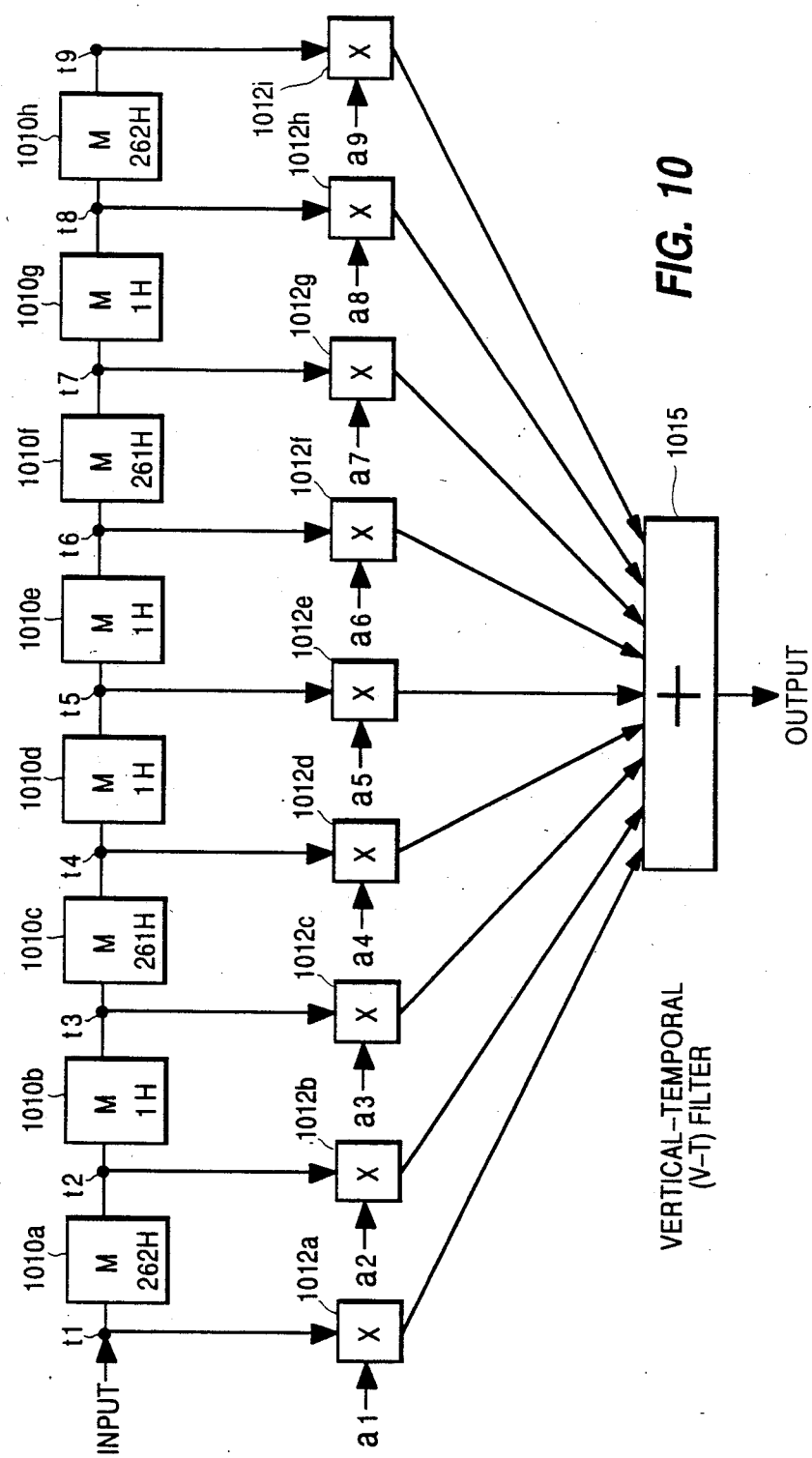

FIG. 10 is a block diagram of an FIR filter suitable for use as the filter 32. The filter shown in FIG. 10 uses samples from four successive fields to generate its output signal. Each of the nine taps of the filter is multiplied by a respective filter coefficient value a1 through a9. FIG. 10a is a chart of coefficient values which may be used to configure the filter shown in FIG. 10 as the VT bandpass filter 32 or as a VT bandstop filter such as that used in the HVT bandpass filter 34.

FIG. 10b is a block diagram of a filter suitable for use as the HVT bandstop filter 34. In actuality, the filter 34 has a flat frequency response characteristic from 0 Hz to 1.5 MHz, and a comb-type frequency response characteristic from 1.5 MHz to 4.2 MHz. The nulls in the comb characteristic are placed to substantially block components of the signal YN that may appear as crosstalk in the modulated chrominance signal. In FIG. 10b, the signal YN is applied to a horizontal low pass filter 1020 which has a passband from 0 Hz to 1.5 MHz. The output signal of the filter 1020 is subtracted from the signal YN provided by a compensating delay element 1022 to produce a high-pass filtered luminance signal. This high-pass filtered luminance signal is applied to a VT bandstop filter 1021, such as that described above in reference to FIGS. 10 and 10a. The output signal of the VT bandstop filter 1024 is combined with the low-pass filtered luminance signal as provided by a compensating delay element 1024 to produce the output signal YP. As shown in FIG. 9, the signal YP and the signal CP provided by the VT bandpass filter 32 are additively combined by a combiner 36 to produce the first component signal C/SL.

Referring to FIG. 1b, the signals IH, QH and YH provided by the side-center signal separator and processor 18, which represent the high frequency components of the side panels of the widescreen image, are applied to an NTSC encoder 60. The encoder 60 may be the same as the NTSC encoder 31 described above. The output signal, NTSCH, of the encoder 60 is applied to a time expander circuit 62 which expands the side panel high frequency signals as indicated in FIG. 3c to develop a signal ESH which occupies a portion of a horizontal line time that corresponds to the center panel portion of the signal C/SL. The time expander 62 may be realized by circuitry such as that described above in reference to FIGS. 12, and 12a through 12d. The signal ESH is the second component signal of the widescreen EDTV signal.

The luminance signal YF' provided by the progressive to interlace scan converter 17c is applied to a bandpass filter 70 which passes frequencies in a range from 5 MHz to 6.0 MHz to an amplitude modulator and low-pass filter 72. The modulator 72, which may be of conventional design, heterodynes the signal provided by the band-pass filter 70 with a sampled data sinusoidal signal, fc, having a frequency substantially equal to 5 MHz. The signal fc is provided by the studio timing signal generator 11. The circuitry 72 includes a low pass filter which substantially removes the baseband signal and modulation signal components above 1.0 MHz. The operation performed by the circuitry 72 is essentially a frequency shifting of the high frequency luminance information from the 5-6.0 Mhz band to a 0-1.0 MHz band. The signal provided by the modulator and low-pass filter 72 is applied to a format encoder 74 which compresses the signal in time to occupy the portion of a horizontal line period that corresponds to the center panel portion of the signal C/SL.

The signal C/SL provided by the NTSC encoder 31, the signal ESH provided by the time expander 62 and the signal provided by the format encoder 74 are intraframe averaged by respective intraframe averaging circuits 38, 64 and 76. The process of intraframe averaging makes the signals in each of the two fields of any frame identical. This process is important to allow the second and third component signals to be combined with the first component signal to in a manner that allows the various component signals of the widescreen EDTV signal to be readily separated by an EDTV decoder.

As set forth above, the signal C/SL is intraframe averaged only for frequency components above 1.5 MHz and only in the center panel region. The components at frequencies less than 1.5 MHz and in the side panel regions are not intraframe averaged to preserve vertical and temporal detail in the reconstituted image. FIG. 11b is a block diagram of circuitry suitable for use as the highs intraframe averager 38. In FIG. 11b, an input signal IN, in this instance the signal C/SL, is applied to a pair of serially connected, one-field (262 H) delay elements 1120 and 1122. The output signal, Y1+C1, of the delay element 1120 is applied to one input port of an averaging circuit 1128, the other input port of which is coupled to receive either the input signal, Y2+C2, or the output signal of the delay element 1122 via a multiplexer 1125. The multiplexer 1125 is conditioned by a frame rate signal, Fs, applied to its control input port, to provide the signal Y2+C2 during one field of a frame and to provide the output signal of the delay element 1122 during the other field of the frame. The multiplexer 1125 always provides a signal which is in the same frame as the signal Y1+C1 provided by the delay element 1120.

The averaging circuitry 1128 scales the signal Y1+C1 by a factor of $-\frac{1}{2}$, scales the signal provided by the multiplexer 1125 by $\frac{1}{2}$ and sums the scaled signals. The signal provided by the averaging circuitry 1128 is high-pass filtered by a filter 1130 to substantially remove components having frequencies less than 1.5 MHz. The output signal of the filter 1130 is applied to a gate 1132. The gate 1132 is controlled by a control signal which may, for example, be generated by circuitry which includes a pixel counter (not shown) and a decoder (not shown), to pass the signal provided by the filter 1130 only during the center panel portion of the signal applied to the gate. The output signal of the gate 1132 is applied to one input port of an adder 1134. The other input port of the adder 1134 is coupled to receive the signal Y1+C1 provided by the delay element 1120. The output signal of the adder 1134 is the signal N shown in FIG. 1b, the output signal of the highs intraframe averager 38.

Circuitry suitable for use as either of the intraframe averagers 64 or 76 is shown in FIG. 11a. In FIG. 11A, a signal IN, which in this instance is the signal ESH is applied to a pair of serially connected delay elements 1110 and 1112. The output signal of the delay element 1110, Y1+C1, is applied to one input port of an averaging circuit 1118 and the input signal, IN, or the output signal of the delay element 1112 is applied to the other input port of the circuit 1118 via a multiplexer 1115. The multiplexer 1115 is conditioned by a field rate (30 Hz) switching signal Fs to alternately pass the signal IN and the output signal of the delay element 112 during alternate field intervals of the input signal. The signal provided by the multiplexer 1115 is always in the same frame interval as the signal Y1+C1 provided by the delay element 1110. The averaging circuitry 1118 scales each of its input signals by a factor of one-half and sums the resultant signals to generate an intra-frame averaged output signal.

Referring to FIG. 1b, the output signal of the highs intraframe averager 38 is applied to one input port of an adder 40. The output signals X and Z of the respective intraframe averagers 64 and 76 are compressed in amplitude and used, by the modulator 80, to modulate the quadrature phase related alternate subcarrier signals ASC and ASC' to produce the signal M. The signal M is applied to a second input port of the adder 40. The output signal, NTSCF, of the adder 40 is the combined first, second and third component signals of the widescreen EDTV signal. The signal NTSCF is applied to a digital to analog converter (DAC) 54.

Figure 13:
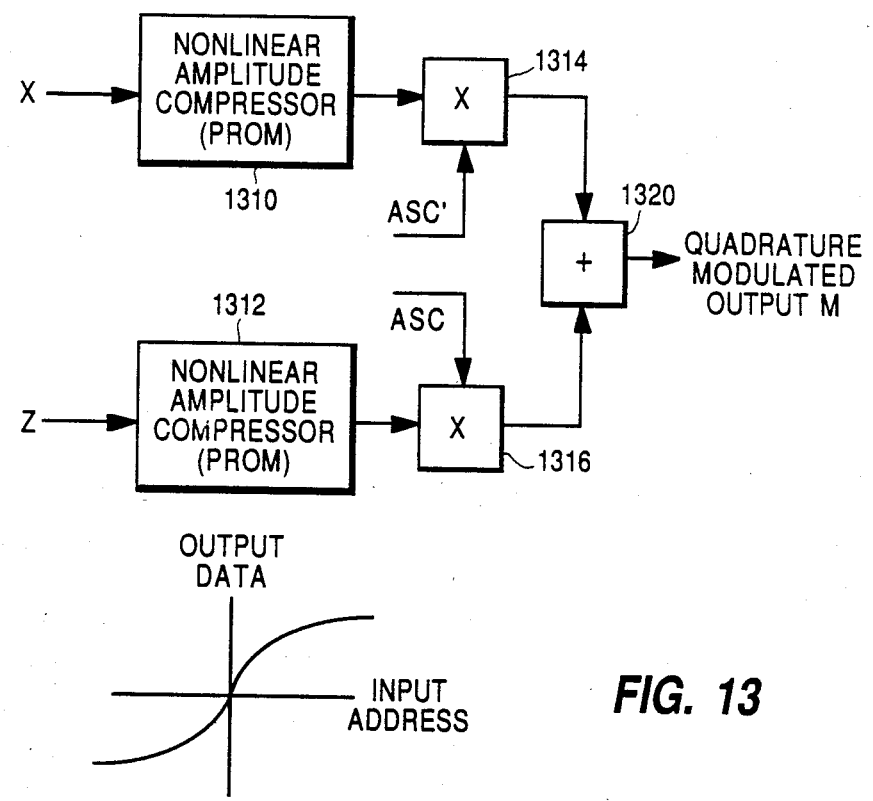
FIG. 13 is a block diagram of amplitude compensation and quadrature modulation circuitry suitable for use in the single channel encoder shown in FIG. 1b.

FIG. 13 is a block diagram of circuitry suitable for use as the modulator 80. In FIG. 13, the signals X and Z provided by the respective intraframe averagers 64 and 76 are applied to respective PROMs 1310 and 1312. Each of the PROMs 1310 and 1312 is programmed with an amplitude compression function an example of which is illustrated by the graphical input-output function adjacent to the PROM 1312. The output signals of the respective PROMs 1310 and 1312 are applied to respective first input ports of multipliers 1314 and 1316, respectively. A second input port of the multiplier 1314 is coupled to receive the alternate subcarrier signal ASC' and a second input port of the multiplier 1316 is coupled to receive the alternate subcarrier signal ASC. The signals ASC and ASC' are provided by the studio timing signal generator 11. The output signals of the multipliers 1314 and 1316 are summed by an adder 1320 to produce the quadrature modulated output signal M.

Figure 1F:
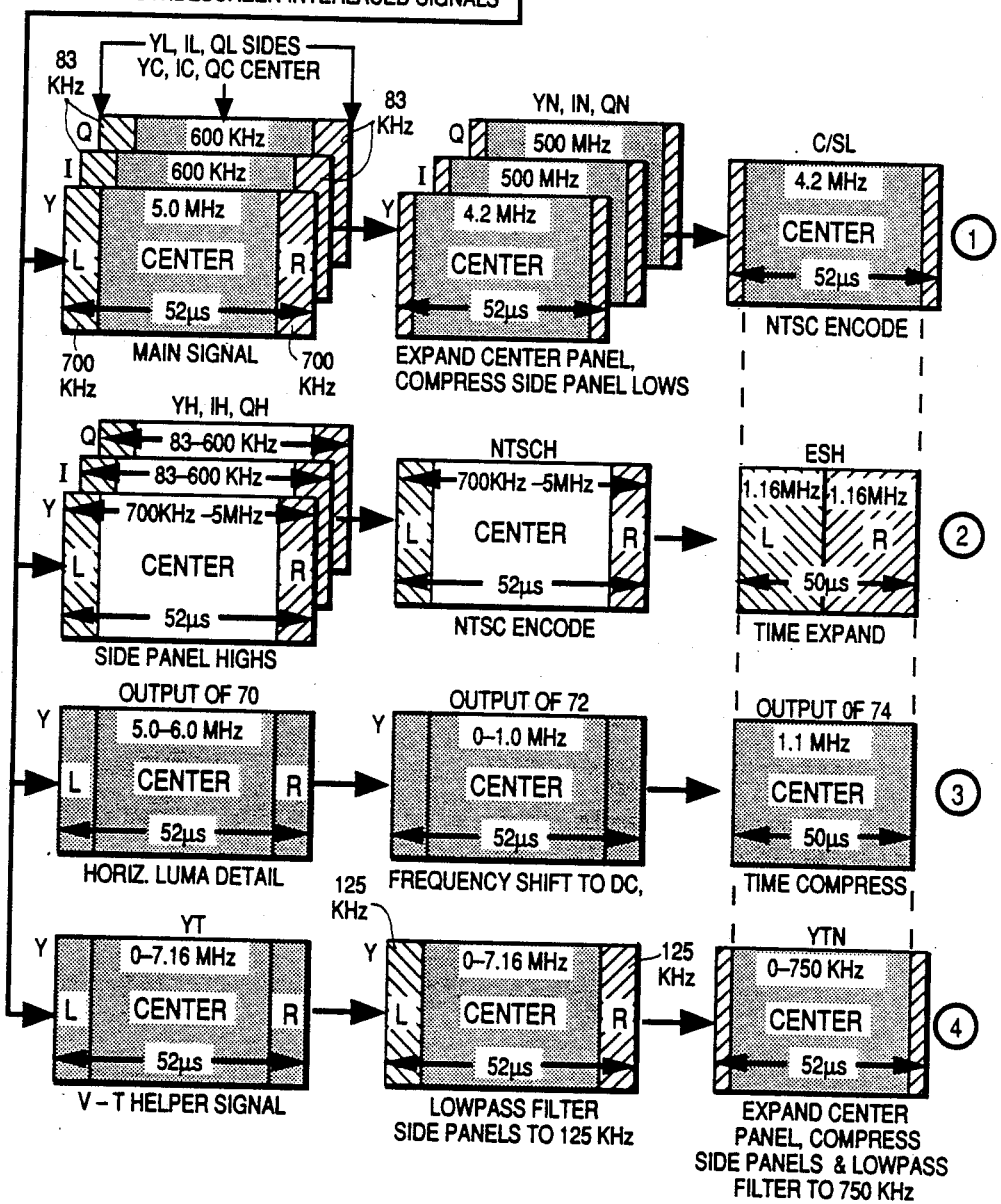

Referring to FIG. 1b, the frame difference signal YT provided by the progressive to interlace scan converter 17c is applied to the format encoder 78. The format encoder 78 may include circuitry of the type described above in reference to FIGS. 12 and 12a-12d. The encoder 78 expands the center panel portion of the signal YT and compresses the side panel portions as illustrated in FIG. 1f. The signal provided by the format encoder 78 is applied to a motion encoder and low-pass filter 79. Exemplary circuitry for use as the motion encoder and low-pass filter 79 is shown in FIG. 23.

The motion encoder of the circuitry 79 translates variations in the signal YT which represent image motion by +10 IRE or −10 IRE depending on whether the signal is positive or negative respectively. This translation enhances the performance of the decoded signal YT at the receiver when there is a significant amount of noise in the transmission channel between the transmitter and the receiver. The use of this motion encoded "helper" signal is described below in reference to FIGS. 22 and 27.

Figure 23:
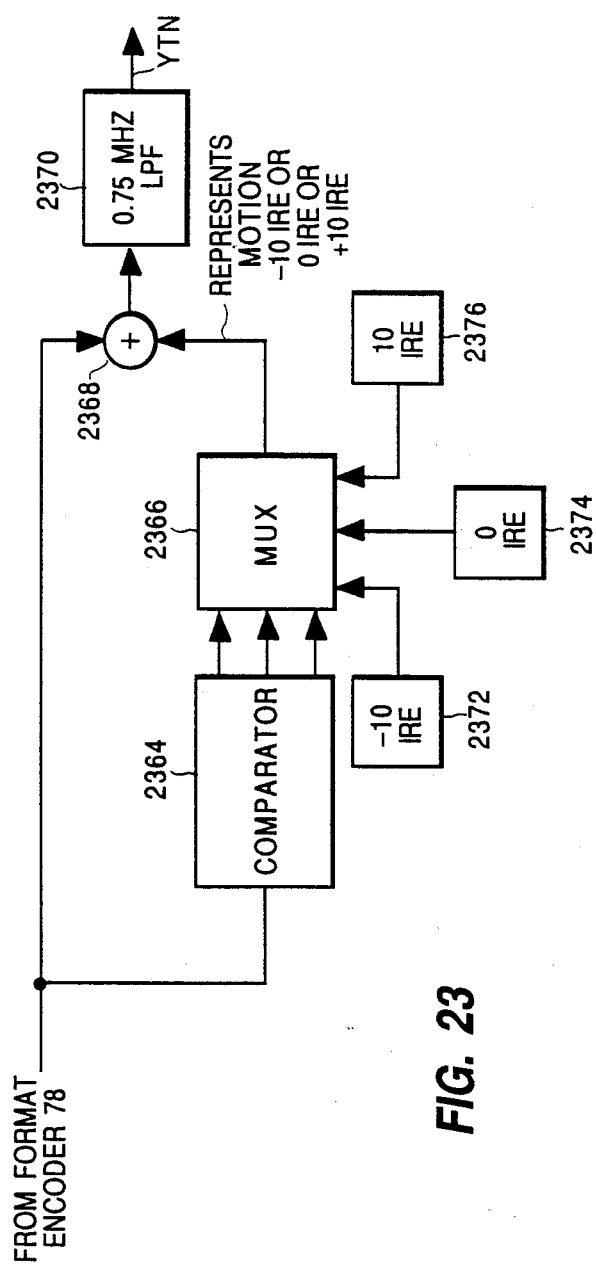
FIG. 23 is a block diagram of a motion encoder and low-pass filter suitable for use in the single channel encoder shown in FIG. 1b.

In the circuitry shown in FIG. 23, the signal provided by the format encoder 78 is applied to one input port of an adder 2368 and to a comparator 2364. The comparator 2364 generates an output signal which indicates whether the signal provided by the format encoder 78 is positive, negative or zero-valued. The signal generated by the comparator 2364 conditions a multiplexer 2366 to pass a digital value representing 10 IRE units, −10 IRE units or 0 IRE units if the helper signal is positive, negative or zero-valued, respectively. The signal provided by the multiplexer 2366 is applied to a second input port of the adder 2368. The output signal of the adder 2368 is applied to a low-pass filter 2378 which has a passband from 0 Hz to 750 KHz. The output signal of the filter 2378 is the output signal YTN of the circuitry 79. This signal is applied to a DAC 53 shown in FIG. 1b.

The DACs 53 and 54 develop analog versions of the respective signals YTN and NTSCF. The signal provided by the DAC 54 is applied to an analog switch 58 which is controlled by a signal SW provided by the studio timing signal generator 11 to insert a composite synchronization signal OCPS, also provided by the generator 11, into horizontal and vertical blanking intervals of the analog NTSCF signal. Although the signal OCPS is shown as an analog signal it is contemplated that a digital signal OCPS may be used. In this instance, the analog switch 58 would be replaced by a conventional two-input multiplexer which would be positioned between the adder 40 and the DAC 54.

The output signal of the switch 58 is applied to one input terminal of a radio frequency (RF) quadrature modulator 57. Another input terminal of the modulator 57 is coupled to receive the helper signal, the analog version of the signal YTN provided by the DAC 53. The modulator 57 produces a vestigial sideband television signal, MAIN, having the signal NTSCF as its in-phase component and the helper signal as its quadrature phase component. The signal provided by the modulator 57 is applied to the transmitter 55 which transmits the signal via the antenna 115.

Figure 14:
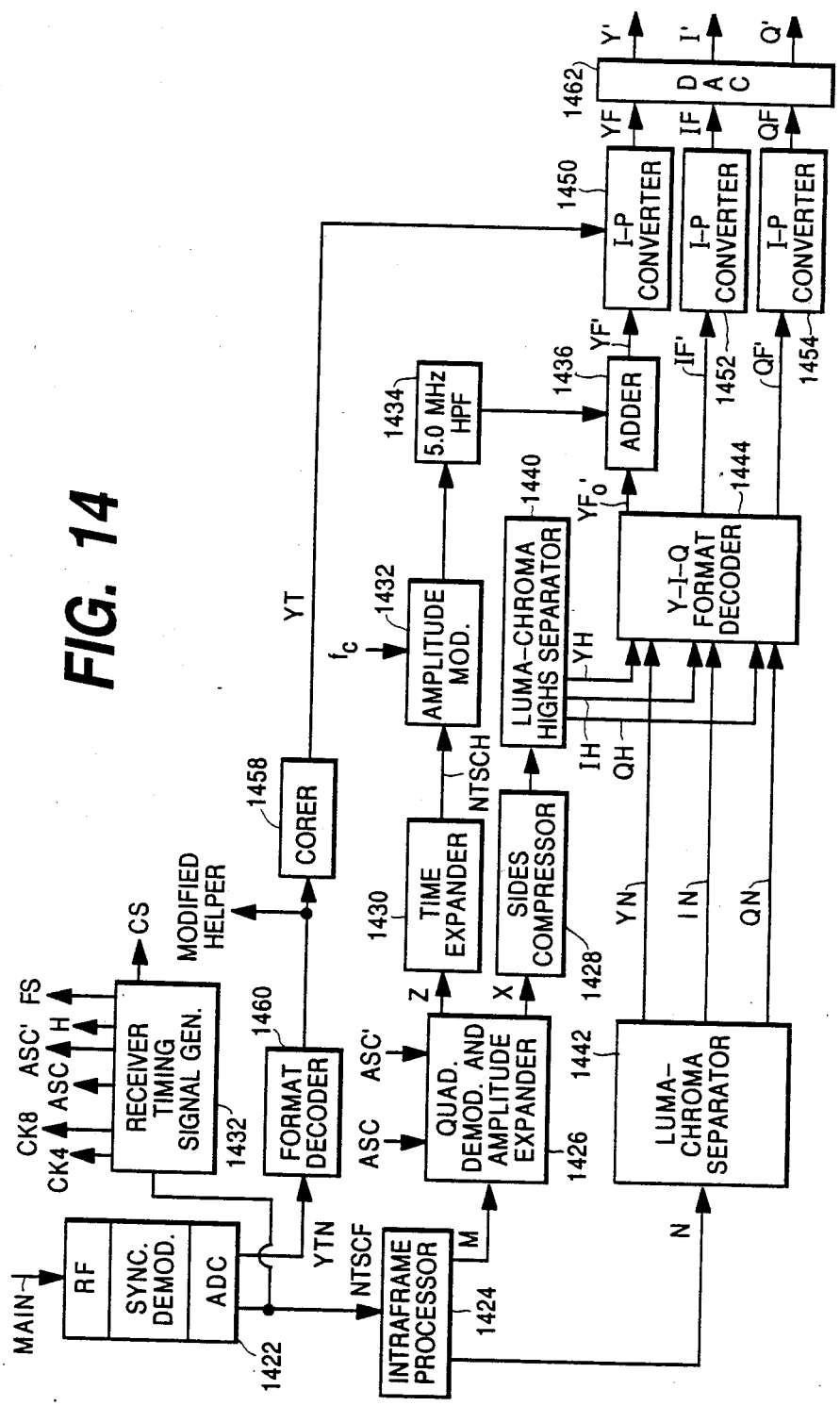
FIG. 14 is a block diagram of a single channel decoder suitable for use in the present invention.

As shown in FIG. 1, the signal MAIN provided by the single channel encoder 114 is applied to a single channel decoder 140. Circuitry suitable for use as the decoder 140 is shown in FIG. 14. In an overview of its operation, the decoder shown in FIG. 14 demodulates the signal MAIN to recover its in-phase and quadrature phase components, NTSCF and YTN, respectively. The signal NTSCF is processed to recover the first, second and third component signals. These signals are further decoded and compressed or expanded, as appropriate and combined to generate a luminance signal YF' and color difference signals IF' and QF', all of which are 525 LPF interlace scan signals. The helper signal, YTN, is also decoded and used to convert the signal YF' to a 525 LPF progressive scan signal. The color difference signals IF' and QF' are converted to progressive scan format without assistance from the helper signal. Finally, the progressive scan signals YF, IF and QF are converted to the analog signals Y', I' add Q'.

In FIG. 14, the signal MAIN is applied to an input unit 1422. The input unit 1422 includes a radio frequency (RF) tuner and amplifier circuit, a synchronous video demodulator which extracts the in-phase and quadrature phase modulation components of the received video signal, and an analog-to-digital converter (ADC). The signal NTSCF provided by the ADC of the input unit 1422 represents the in-phase modulation component of the signal MAIN; the signal YTN represents the quadrature phase modulation components.

The signal NTSCF is applied to synchronizing signal separation and clock signal generation circuitry 1432. The circuitry 1432 includes conventional circuitry which separates the horizontal and vertical synchronizing signals, HS and VS, respectively, from the signal NTSCH and combines the signals HS and VS to generate a composite synchronizing signal, CS. The circuitry 1432 also includes a conventional phase locked loop (PLL) which generates two clock signals, CK4 and CK8, having respective frequencies of 4xfsc and 8xfsc, four times and eight times the frequency, fsc, of the color synchronizing burst signal component of the signal NTSCH. The circuitry 1432 generates, from the signal CK4, quadrature phase related alternate subcarrier signals, ASC and ASC', having a frequency substantially equal to 3.1 MHz, 395 times one-half the horizontal line scanning frequency, and a signal fc having a frequency substantially equal to 5 MHz. The signals ASC, ASC' and fc may be generated, for example by incrementing a counter (not shown) with the signal CK4 and applying the counter value to a read only memory (ROM) (not shown) that is programmed to provide sample values representing the three signals. In addition, the ROM may provide an output signal H indicative of a predetermined pixel sampling time on each horizontal line interval of the signal NTSCF. This signal may be applied to a further counter (not shown) which is programmed to provide signals, such as FS described below in reference to FIGS. 15 and 16, which occur at a frame or field rate. Exemplary circuitry for generating the various clock and timing signals in the receiver is described in greater detail in the above-referenced U.S. patent application Ser. No. 241,277.

Figure 15:
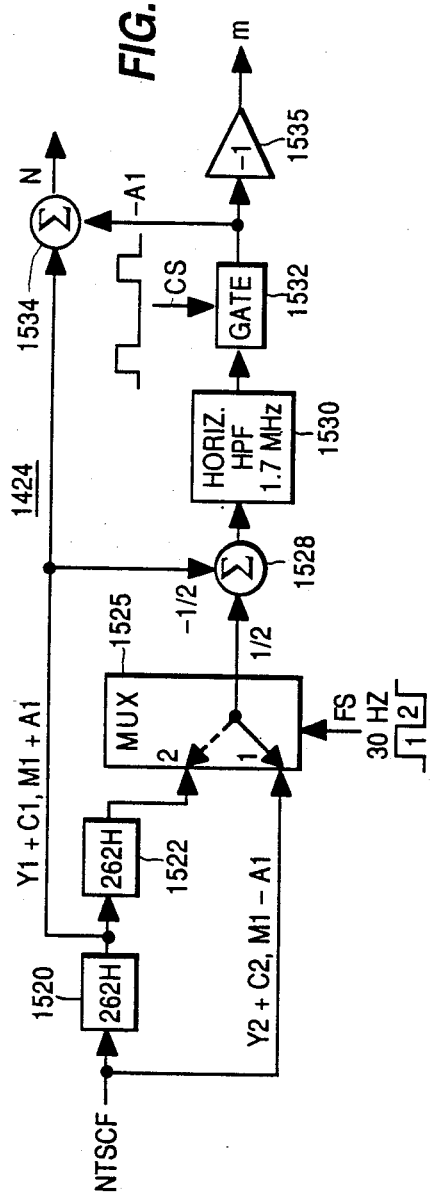
FIGS. 15 and 16 are block diagrams of circuitry suitable for use as the intraframe averager-differencer of the single channel decoder shown in FIG. 14.
Figure 16:
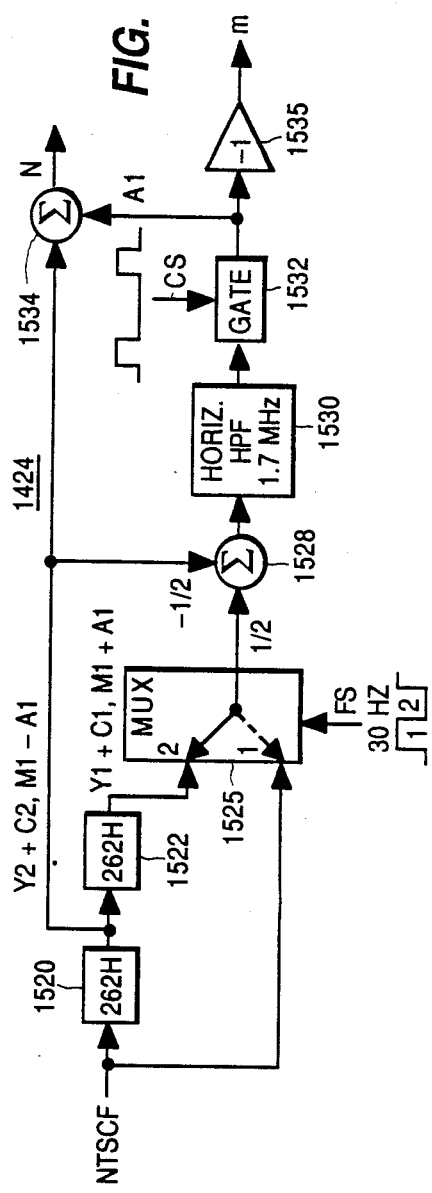

The signal NTSCF provided by the input unit 1422 is also applied to intraframe averager-differencer circuitry 1424. The circuitry 1424 generates average pixel values and pixel difference values for corresponding pixels in two fields which constitute a frame. The average pixel values are the output signal N, which corresponds to the first component of the EDTV signal, and the pixel difference values are the output signal M which corresponds to the modulated second and third components of the widescreen EDTV signal. FIGS. 15 and 16 are block diagrams showing circuitry suitable for use as the intraframe averager-differencer 1424. FIG. 15 illustrates the operation of the circuitry 1424 during the first field of a frame and FIG. 16 illustrates the operation of the circuitry during the second field of a frame.

In FIGS. 15 and 16, the signal NTSCF, as an input signal IN, is applied to two serially connected delay elements 1520 and 1522. The delay elements 1520 and 1522 each provide a time delay substantially equal to one field period (262 H). The signal IN and the output signal of the delay element 1522 are applied to respectively different input ports of a multiplexer 1525. The multiplexer 1525 is conditioned by a frame rate signal FS, provided by the timing signal generator 1432, to pass its two input signals during alternate field intervals of the signal MAIN. The signal provided by the multiplexer 1525 is always in the same frame as the signal provided by the delay element 1520. The signal provided by the delay element 1520 and the signal provided by the multiplexer 1525 are applied to an averaging circuit 1528.

The circuit 1528 scales the signals provided by the delay element 1520 and the multiplexer 1525 by respective factors of $-\frac{1}{2}$ and $\frac{1}{2}$ and sums the scaled signals. This operation cancels any components of the signal NTSCH that are common between the two fields which constitute a frame, i.e. first component signals of the widescreen EDTV signal having frequencies greater than 1.5 MHz. Output signals of the averaging circuitry 1528 are applied to a horizontal high-pass filter 1530 which substantially removes the first component signals having frequencies less than 1.7 MHz. The signals provided by the filter 1530 are passed through a gate 1532 which is controlled by a signal CS provided by the timing signal generator 1432. The signal CS conditions the gate 1532 to pass only the center panel portion of the signal provided by the filter 1530. This portion is an inverted version of the signal M, the quadrature modulated second and third component signals of the widescreen EDTV signal. The signal provided by the gate 1532 is added, by an adder 1534, to the signal provided by the delay element 1520 to produce the first component signal, N, and complemented by circuitry 1535 to produce the signal M.

Figure 17:
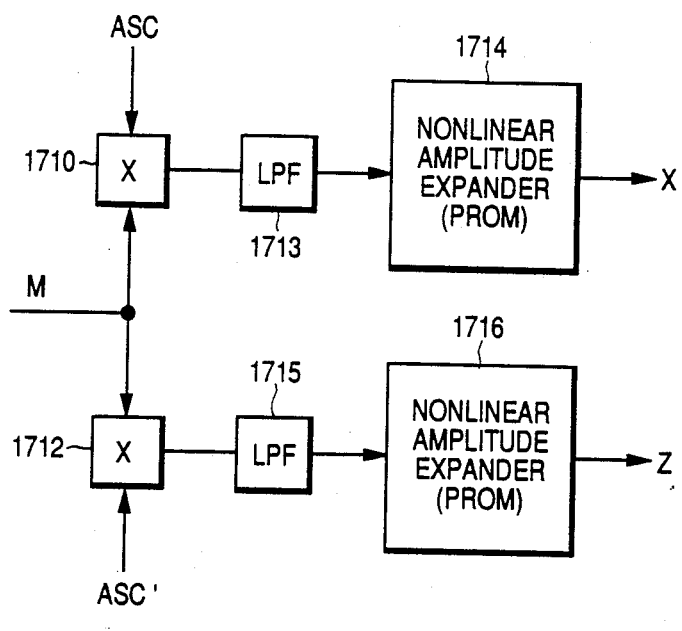
FIGS. 17 is a block diagram of a quadrature demodulator and amplitude expander suitable for use in the single channel decoder shown in FIG. 14.

Referring to FIG. 14, the signal M provided by the circuitry 1424 is applied to quadrature demodulator and amplitude expander circuitry 1426. The circuitry 1426 quadrature demodulates the signal M and expands the amplitude of the resultant in-phase and quadrature phase signals to recover the respective second and third components of the EDTV signal. FIG. 17 is a block diagram of circuitry suitable for use as the quadrature demodulator and amplitude expander circuitry 1426.

In FIG. 17, the signal M is multiplied by the signals ASC and ASC' in respective multipliers 1710 and 1712. The output signals of the multipliers 1710 and 1712 are applied to respective low-pass filters 1713 and 1715 which substantially remove the signal M and any high frequency modulation components. The output signals of the filters 1713 and 1715 are applied to respective programmable read only memories (PROMs) 1714 and 1716. The PROMS 1714 and 1716 are programmed with an amplitude expansion function that is the inverse of the amplitude compression function that was used in the encoder to psycho-physically hide the second and third component signals in the compatible composite signal. The output signal, X, of the PROM 1714 is the decoded second component signal, the expanded high frequency components of the side panel signals. The output signal, Z, of the PROM 1716 is the decoded third component signal, the frequency shifted high frequency luminance signal components of the wideband widescreen EDTV signal.

Referring to FIG. 14, the signal X is applied to side panel compressor circuitry 1428 which effectively reverses the expansion of the side panel data performed by the encoder circuitry. This operation produces a signal NTSCH, which represents the high frequency components of the side panel signals, restored to their proper time relationship with a time compressed center panel signal developed by a Y-I-Q format encoder 1444, described below in reference to FIG. 19. The compressor circuitry 1428 may be realized by circuitry of the type described above in reference to FIGS. 12 and 12a–12d.

The signal NTSCH is developed from the expanded side panel data in the second component signal, X, of the EDTV signal using a compression factor of 0.22. The signal NTSCH is applied to luminance-chrominance separation circuitry 1440 which separates the luminance (YH) and chrominance components of the signal NTSCH and demodulates the chrominance signal component to obtain two color difference signal components (IH and QH). The signals YH, IH and QH are applied to the Y-I-Q format decoder 1444 along with signals YN, IN and QN developed from the first component signal, N, by luminance-chrominance separation circuitry 1442. The circuitry 1440 and 1442 may be identical; exemplary circuitry is shown in FIG. 18.

Figure 18:
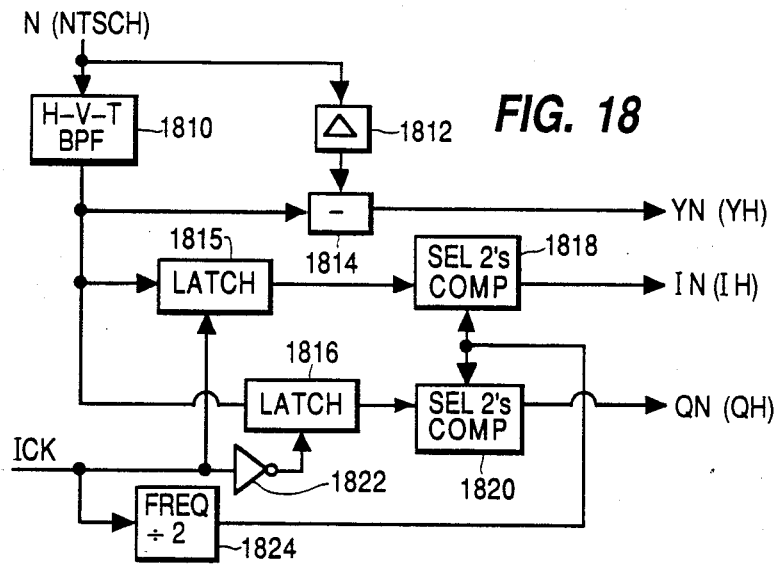
FIG. 18 is a block diagram of a luminance-chrominance signal separation circuit suitable for use in the single channel decoder shown in FIG. 14.

In FIG. 18, the signal N or the signal NTSCH is applied to a band-pass filter 1810 and to a delay element 1812 which compensates for the processing delay through the filter 1810. The filter 1810 used in this embodiment of the invention is a horizontal-vertical-temporal (H-V-T) band-pass filter. Exemplary circuitry for use as the HVT filter 1810 is shown in FIG. 10c. This filter includes a horizontal bandpass filter 1030 having a passband from 3 MHz to 4.2 MHz and a VT bandpass filter 1031 which is defined by the FIR filter shown in FIG. 10 and the coefficient values shown in FIG. 10a. The output signal of the filter 1810 is a separated chrominance signal. This signal is applied to the subtrahend input port of a subtractor 1814, the minuend input port of which is coupled to receive the signal provided by the compensating delay element 1812. The output signal of the subtractor 1814 is the luminance component signal, YN or YH.

The chrominance signal developed by the filter 1810 may be represented as a sequence of sample values, I, Q, −I, −Q, I, Q etc. where I and Q indicate samples of the I and Q color difference signals, and the signs of the samples indicate sampling phase, not necessarily sample polarity. This chrominance signal is applied to first and second latches 1815 and 1816. The latch 1815 is responsive to the I-phase clock signal, ICK, provided by the clock generation circuitry 1432 of FIG. 14, to hold sample values of the chrominance signal that represent the I color difference signal component of the chrominance signal. The latch 1816 is responsive to an inverted version of the signal ICK, provided by an inverter 1822, to hold sample values representing the Q color difference signal component of the chrominance signal. The output signals provided by the latches 1815 and 1816 are applied to respective twos complementing circuits 1818 and 1820. The circuits 1818 and 1820 are controlled by a signal provided by a frequency divider 1824 to complement alternate ones of the sampled data I and Q color difference signals. The signals provided by the circuits 1818 and 1820 are the demodulated signals IN or IH and QN or QH, respectively.

Figure 19:
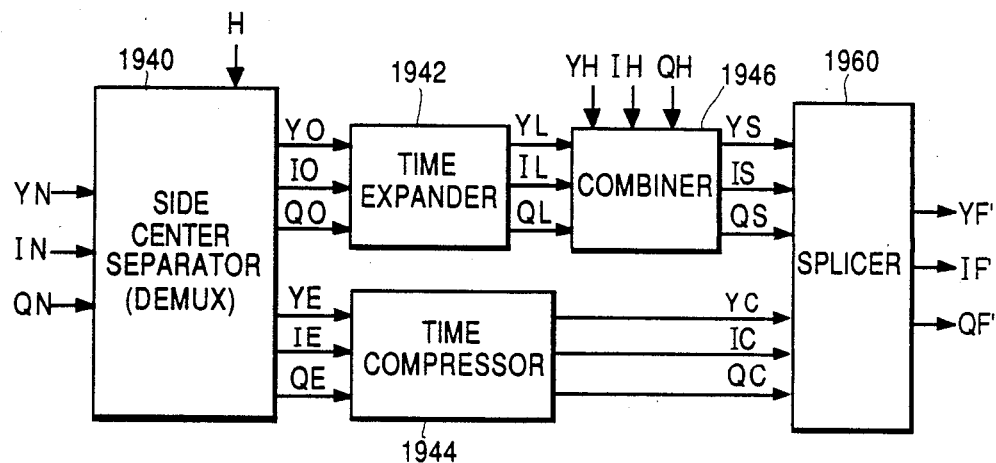
FIG. 19 is a block diagram of circuitry suitable for use as the Y-I-Q format decoder of the single channel decoder shown in FIG. 14.

As set forth above, the signals YH, YN, IH, IN, QH and QN are applied to a Y-I-Q format decoder 1444 where they are combined to form widescreen signals $YF_0'$, IF′ and QF′. Exemplary circuitry which may be used as the format decoder 1444 is shown in FIG. 19. In FIG. 19, the first component luminance and color difference signals, YN, IN and QN, are applied to side panel—center panel separator circuitry 1940. The circuitry 1940, which may, for example, include a demultiplexer (not shown) and a pixel counter (not shown) separates pixel values on each line that represent the low frequency components of the side panel signals from the samples that represent the center panel signal. In this embodiment of the invention, samples 1–14 and 741 to 754 represent the side panel signal while samples 15 to 740 represent the center panel signal.

The circuitry 1940 provides sampled data signals, YO, IO, and QO, representing the side panels are applied to a time expander 1942 which expands the signal in time by a factor of 6 to produce signals YL, IL and QL which represent the low frequency components of the side panel signals, restored to their proper time relationship. These signals are added in combiner circuitry 1946 to the signals YH, IH and QH to generate the restored side panel signals YS, IS and QS.

The circuitry 1940 also provides sampled data signals YE, IE, and QE which represent the time-expanded center panel portion of the first component of the EDTV signal. These signals are applied to a time compressor 1944 which compresses the sampled data signals in time by a factor of 0.81 to generate restored center panel signals YC, IC and QC.

The restored side and center panel signals are recombined by a splicer 1960 to generate widescreen luminance (YF′) and color difference signals (IF′ and QF′).

Figure 19A:
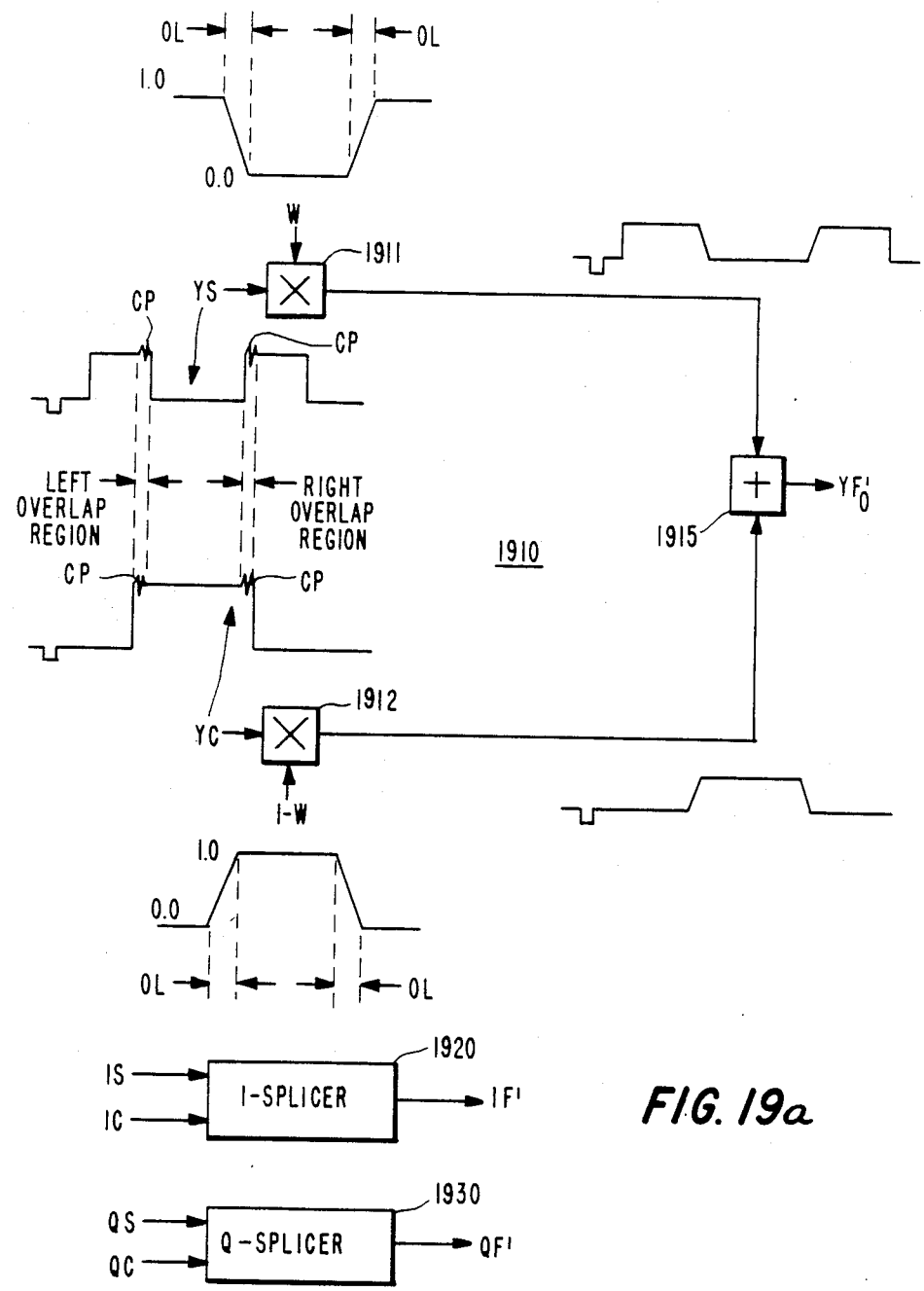
FIG. 19a is a block diagram of a side-panel, center-panel splicer suitable for use in the format decoder shown in FIG. 19.

Circuitry suitable for use as the splicer 1960 is shown in FIG. 19a. In FIG. 19a, the splicer is shown as including a network 1910 for splicing the luminance center panel and side panel signals, YC and YL, respectively to generate the widescreen luminance signal, $YF_0'$. In addition, FIG. 19a shows an I signal splicer 1920 and a Q signal splicer 1930 which have the same structure and operation as the illustrated Y signal splicer.

In the encoding operation, the center panel and side panel signals are purposely overlapped by, for example ten samples, to compensate for corruption of sample values at the boundaries of the side and center panel regions which may occur in the expansion and compression processes. If the panels did not have an overlap region, the corrupted samples would be abutted against each other and a seam would be visible in the reproduced image. An overlap region of ten samples has been found sufficient to compensate for up to five corrupted sample values.

In FIG. 19a, a multiplier 1911 multiplies the side panel signal YS by a weighting function W in the overlap regions, as illustrated by the associated waveform, before signal YC is applied to an adder 1915. Similarly, a multiplier 1912 multiplies the center panel signal YC by a complementary weighting function (1−W) in the overlap regions, as illustrated by its associated waveform, before the signal YC is applied to the adder 1915. These weighting functions exhibit a linear ramp-type characteristic over the overlap regions and have values between 0 and 1. They may be realized, for example by a combination of a sample counter (not shown) which addresses a ROM (not shown) containing sample values representing the weighting functions. The output signal of the adder 1915 is the spliced widescreen luminance signal $YF_0'$.

Referring to FIG. 14, the signal Z, provided by the quadrature demodulator and amplitude expander 1426, is applied to a time expander 1430. The time expander 1430, which may be realized by circuitry such as that described above in reference to FIGS. 12 and 12a–12d, expands the signal Z, the third component signal of the widescreen EDTV signal, to occupy the full active video portion of the horizontal line interval. The signal provided by the time expander 1430 is applied to an amplitude modulator 1432.

The modulator 1432 multiplies the signal provided by the time expander 1430 by the signal fc, provided by the clock generation circuitry 1432 to restore the high frequency luminance signal to its original band of frequencies. The high frequency luminance signal provided by the modulator 1434 is applied to a high-pass filter 1436 which blocks frequencies less than 5 MHz. This filter removes the baseband component of the signal provided by the modulator 1432 and any low frequency modulation components. The output signal of the high-pass filter 1436 is applied to one input terminal of an adder 1436, the other input terminal of which is coupled to receive the signal $YF_0'$. The adder 1436 combines the high frequency components of the luminance signal (between 5.0 MHz and 6.0 MHz) with the widescreen luminance signal $YF_0'$ to generate the wideband widescreen luminance signal YF′.

The helper signal, YT, is recovered from the signal YTN provided by the input unit 1422 by applying the signal YTN to a format decoder 1460 and a coring circuit 1458. The format decoder 1460 expands the center panel portions and compresses the center panel portions of the signal YTN to regenerate the modified helper signal which is applied to the coring circuit 1458. The circuit 1458 changes values of the modified helper signal having values between −10 IRE units and +10 IRE units to 0 IRE units. In addition, the circuitry 1458 subtracts 10 IRE units from the magnitude of any sample values of the signal YTN that have a magnitude greater than 10 IRE units. This reverses the level shifting performed by the encoder and eliminates any low-amplitude noise (less than 10 IRE) from the modified helper signal. The output signal of the coring circuit 1458 is applied to an interlace to progressive scan converter 1450 which is described below in reference to FIG. 21.

The signals YF′, IF′ and QF′ are applied to respective interlace-to-progressive scan converters 1450, 1452 and 1454. FIGS. 20 and 21 are block diagrams of exemplary scan converters 1452 (or 1454) and 1450, respectively. The scan converter shown in FIG. 20 includes an adder 2014 and a divide-by-two circuit 2016 which average the input signal B (i.e. IF′ or QF′) with a signal A, provided by a delay element 2012, to produce a signal X. The signal A is delayed by one frame interval with respect to the signal B. The signal X and a signal C provided by a delay element 2010 are applied to respective dual-port memories 2018 and 2020. Sample values are written into the memories 2018 and 2020 responsive to the signal CK4 and read from the memories 2018 and 2020 responsive to the signal CK8. The output signals of the memories 2018 and 2020 are applied to respective input ports of a multiplexer 2022. Lines of the signal X are alternated, by the multiplexer 2022, with lines of the signal C, to form the 525 LPF progressive scan signal IF or QF.

The scan converter shown in FIG. 21 includes all of the circuitry shown in FIG. 20 and additionally includes an adder 2118 which adds the regenerated helper signal, YT, to the frame averaged signal X to generate a signal X′. As set forth above, the signal YT represents the difference between a frame averaged approximation of lines of sample values and the actual sample values. Thus, the signal X′ represent interstitial lines of samples which have been corrected for errors in the averaging process used to generate the samples. The output signal of the scan converter shown in FIG. 21 is the 525 LPF progressive scan signal YF.

Referring to FIG. 14, the signals YF, IF and QF are applied to DAC circuitry 1462 which generates the respective analog signals Y′, I′ and Q′. As shown in FIG. 1, the signals Y′, I′ and Q′ are subtracted from the wideband, widescreen 1050 LPF interlace scan signals Y, I and Q to generate the wideband difference signals ΔY, ΔI and ΔQ. These wideband difference signals are applied to the auxiliary channel encoder 142.

As set forth above, in reference to FIG. 1, the wideband difference signal ΔY has a frequency spectrum which ranges from 0 Hz to 20 MHz and the signals ΔI and ΔQ have frequency spectra which range from 0 Hz to 10 Mhz. The auxiliary channel encoder 142 encodes these signals into a signal AUX which has a 6 MHz bandwidth. In addition the signal AUX may include a digital audio signal. The encoder 142 uses separate circuitry for encoding the luminance difference signal ΔY and the two color difference signals ΔI and ΔQ. The circuitry for encoding ΔY is shown in FIG. 22 and the circuitry for encoding ΔI and ΔQ is shown in FIG. 24.

Figure 22:
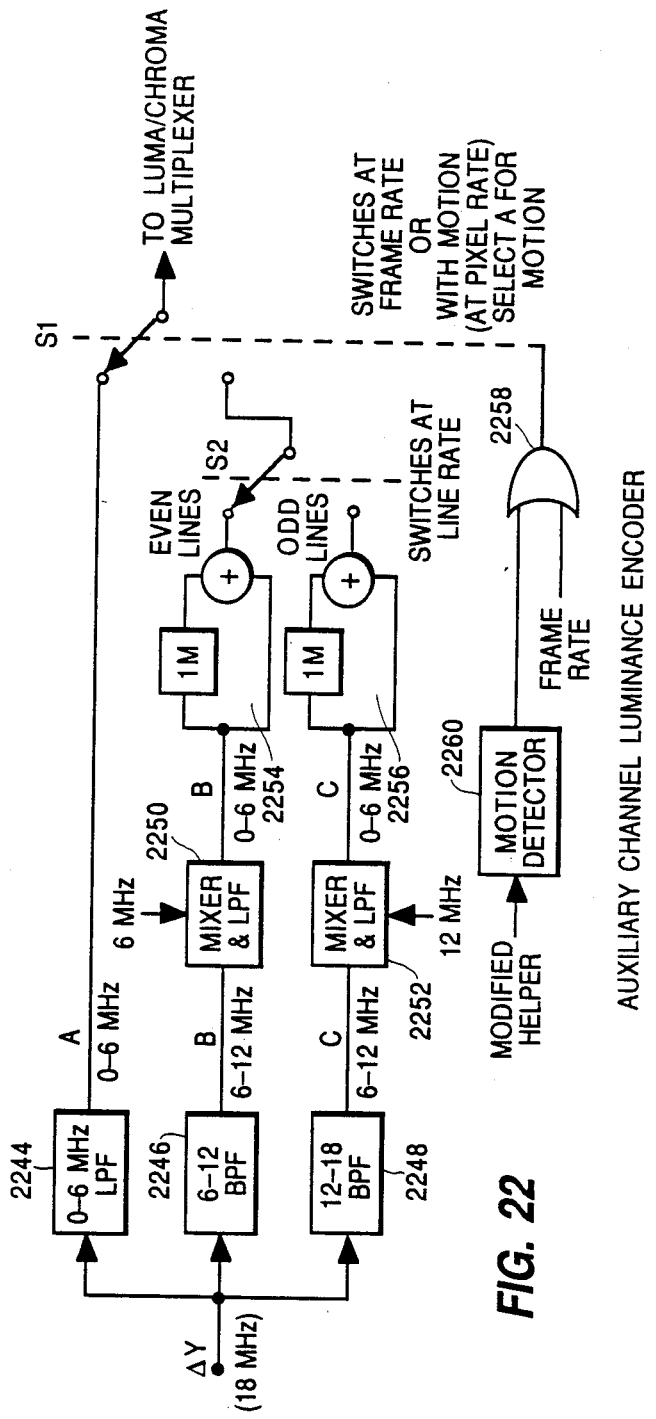
FIG. 22 is a block diagram of an auxiliary channel luminance signal encoder suitable for use in the auxiliary channel encoder of the system shown in FIG. 1.

In FIG. 22, the signal ΔY is split into components "A", "B" and "C" by means of a 0–6 MHz low-pass filter 2244, a 6–12 MHz bandpass filter 2246 and a 12–18 MHz bandpass filter 2248. The frequencies between 18 MHz and 20 MHz contain little energy and are not sent. Thus component A exhibits a frequency spectrum of 0–6 MHz, component B exhibits a frequency spectrum of 6–12 MHz and component C exhibits a frequency spectrum of 12–18 MHz. Component A is coupled to one input terminal of a switch S1.

Components B and C are down-converted by respective mixer and low-pass filter circuits 2250 and 2252 to occupy a band of frequencies between 0 Hz and 6 MHz. Pairs of lines of the down-converted components B and C are averaged by respective line averagers 2254 and 2256. The averaged lines are coupled to respectively different input terminals of a switch S2 which operates at a 15 KHz rate (one-half of the 32 KHz rate horizontal line rate). The output signal of the switch S2 contains averaged lines of the B component signal alternated with averaged lines of the C component signal. The averaging and alternation of the B and C component lines reduces the vertical bandwidth of the horizontal high frequency components represented by the B and C component signals. Since alternate lines of the output signal of switch S2 represent luminance information in the 6–12 MHz and 12–18 MHz frequency bands, this operation effectively packs information in the 6–18 MHz frequency band into the 0–6 MHz frequency band. The output terminal of the switch S2 is coupled to a second input terminal of the switch S1.

Switch S1 is responsive to a switching signal provided by an OR gate 2258. The inputs to the OR gate 2258 are a 15 Hz (one-half of the 30 Hz frame rate) square wave signal and a motion indicative signal provided by a motion detector 2260. In the absence of motion in the image produced by the widescreen HDTV source 110, i.e. when the image is still, switch S1 switches for each frame to produce the sequence of fields indicated in FIG. 22a. However, when motion is present in the image, switch S1 is conditioned to provide only component A.

While many motion detectors are known, the modified helper signal (the fourth component of the widescreen EDTV signal described above) is advantageously employed to derive the motion indicative signal as will be described next. The modified helper signal may be provided to the auxiliary channel encoder 142 by the single channel decoder 140 as indicated in FIG. 1. This signal is produced in the manner described in reference to FIG. 23.

Figure 28:
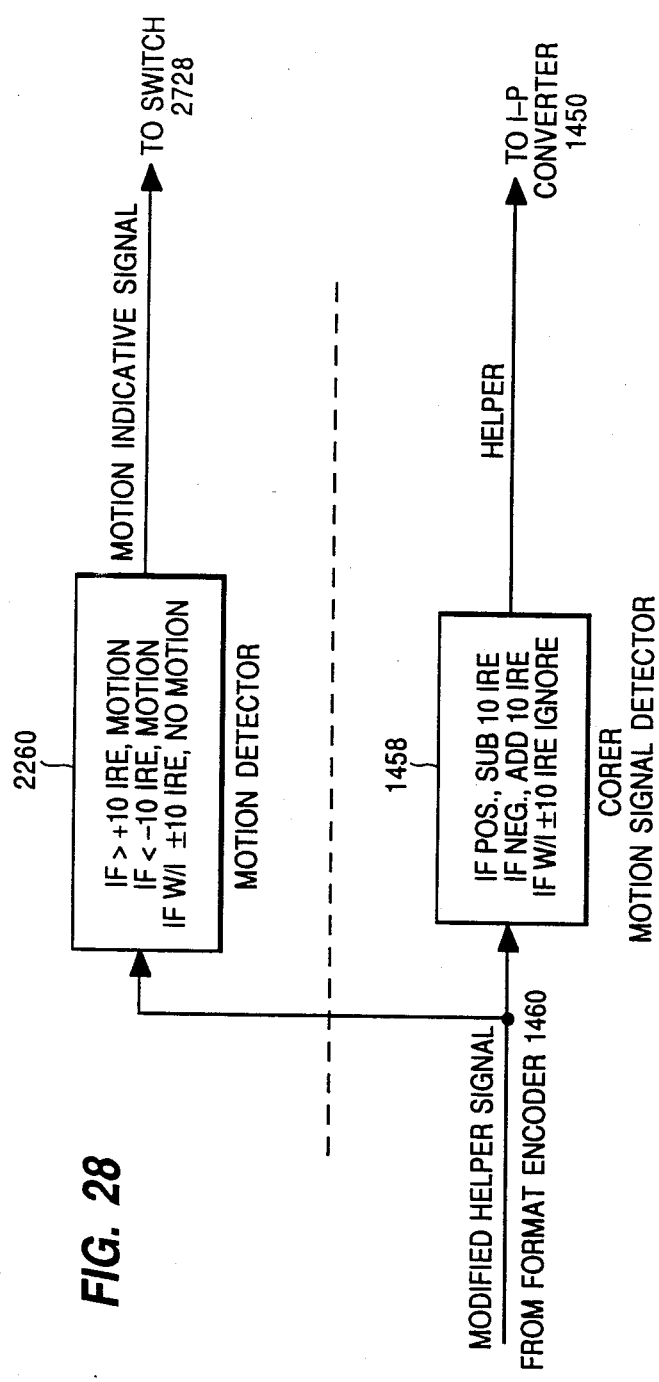
FIG. 28 is a block diagram of circuitry suitable for use as the motion signal detector of the auxiliary channel luminance signal encoder shown in FIG. 22 and the luminance augmentation signal decoder shown in FIG. 27.

FIG. 28 illustrates the interface between the single channel decoder 140 and the auxiliary channel encoder for providing the helper signal. In FIG. 28, the modified helper signal provided by the format decoder 1460 is applied to the corer circuitry 1458, as shown in FIG. 14 and to the motion detector 2260. For values of the modified helper signal between 10 IRE units and −10 IRE units, the signal provided by the detector indicates no motion, while for values outside this range, the signal provided by the detector indicates that there is interframe motion in the image being processed.

FIG. 24 is a block diagram of circuitry which may be used to encode the difference signals ΔI and ΔQ. The circuitry shown in FIG. 24 reduces the horizontal and vertical bandwidth of each of the signals ΔI and ΔQ, time division multiplexes the reduced-bandwidth ΔI and ΔQ signals and then time-compresses the resulting signal. The time compressed signal is split into high and low frequency components which are alternately provided at a field rate to form a signal CA. The signal CA and the signal YA provided by the auxiliary channel luminance signal encoder are time division multiplexed to produce a video signal having a multiplexed component format as illustrated in FIG. 24a.

More specifically, in FIG. 24, the signals ΔI and ΔQ are applied to respective 2.4 MHz low-pass filters 2410 and 2416 which reduce the resolution of the ΔI and ΔQ signals. The bandlimited signals provided by these filters are applied to respective line averaging circuits 2412 and 2418. The circuits 2412 and 2418 average corresponding sample values from successive lines of the respective signals ΔI and ΔQ. The signals provided by the averaging circuits 2412 and 2418 are applied to respective input ports of a line rate multiplexer 2414. The line rate multiplexer 2414 provides samples of the line averaged ΔI and ΔQ signal during alternate line intervals to pack both the ΔI and ΔQ signals into a single 2.4 MHz signal. The signal provided by the multiplexer 2414 is compressed in time by a factor of 5 by time compression circuitry 2422. The output signal of the circuitry 2422 is a 12 MHz signal (2.4×5=12) during 150 sample intervals of each horizontal line interval (910 sample intervals). This signal is split into two components having respective frequency spectra of 0-6 MHz and 6-12 MHz by a low-pass filter 2424 and a bandpass filter 2426, respectively. The signal provided by the bandpass filter 2426 is down-converted to the 0-6 MHz range by a mixer 2428, the output signal of which is applied to a field delay element 2430. The signals provided by the low-pass filter 2424 and the field delay element 2430 are applied to respective input ports of a field rate multiplexer 2432. The multiplexer 2432 alternately provides the signals applied to its input ports during successive field intervals as the signal CA. Although it is not shown, it is contemplated that the field delay element 2430 may be replaced by a frame delay element and that the multiplexer 2432 may be controlled by a motion indicative signal such as that provided by the OR gate 2258 of FIG. 22. In this instance, the high and low frequency components of the signals ΔI and ΔQ would alternately be sent on a frame basis for still areas of an image and only the low frequency components of the signals ΔI and ΔQ would be sent for moving areas of the image. This change would match the spatial and temporal resolution of the signals ΔI and ΔQ to that of the signal ΔY.

The signal CA and the signal YA provided by the circuitry illustrated in FIG. 22 are applied to respectively different input ports of a luma/chroma multiplexer 2434. The multiplexer 2434 passes the signal YA for the first 755 sample intervals of each active horizontal line period, the signal CA for the next 150 sample intervals and a blanking signal for the last 5 sample intervals. The digital audio signal shown in FIG. 1 may be inserted by apparatus (not shown) during the vertical blanking interval of the auxiliary video signal and included in the signal YA/CA.

Figure 25:
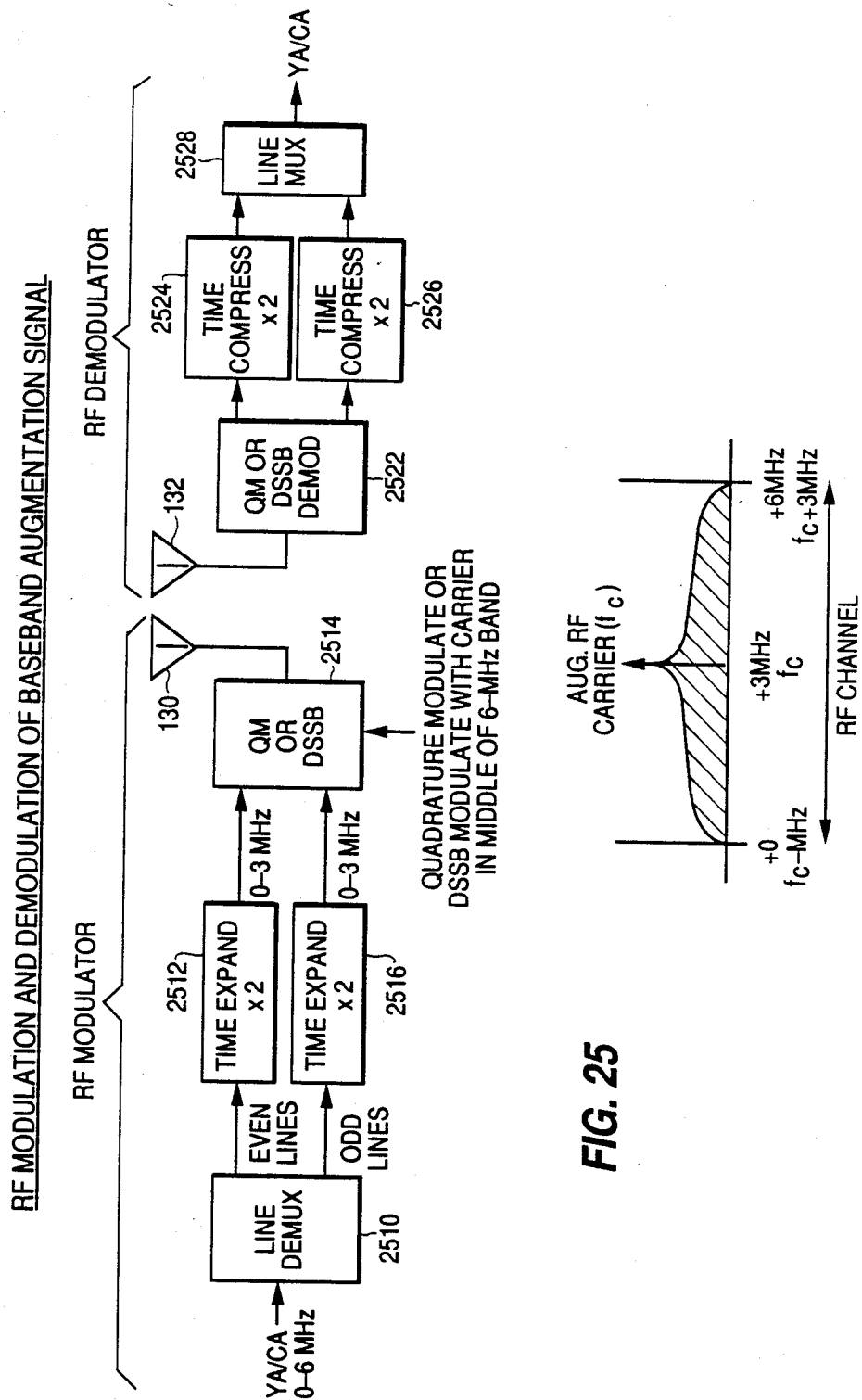
FIG. 25 is a block diagram of exemplary circuitry for modulating and demodulating the auxiliary signal generated by the auxiliary channel encoder shown in FIG. 1.

FIG. 25 is a block diagram of RF modulation and demodulation circuitry suitable for use in the system shown in FIG. 1. In this circuitry, the 6 MHz signal YA/CA is applied to a line demultiplexer 2510 which provides even numbered line intervals of the signal YA/CA to a time expander circuit 2512 and odd numbered line intervals to a time expander circuit 2516. The circuits 2512 and 2516 expand the signals applied to their input ports in time by a factor of two so that each line of input signal corresponds to two lines of output signal and occupies a band of frequencies between 0 Hz and 3 MHz. The signals provided by the time expander circuits 2512 and 2516 are applied to a modulator 2514 which may either double-sideband modulate (DSM) a pair of quadrature phase related carrier signals with the two input signals, or double single-sideband modulate (DSSM) one carrier signal with each of the input signals, retaining the upper sideband for one signal and the lower sideband for the other signal. The signal provided by the modulator 2514 produces little co-channel interference with existing terrestrial broadcast television signals since the carrier is located in the center of the transmission spectrum and whatever interference may be present will not be as coherent as that produced by an interfering conventional television signal. The output signal of the modulator 2514 is the signal AUX which is transmitted via the antenna 130 to the two channel decoder 134. The decoder 134 receives the signal AUX via the antenna 132.

An RF demodulator 2522 in the two channel decoder 134 demodulates the two time expanded signals and applies the results to time compressor circuits 2524 and 2526. The circuits 2524 and 2526 compress their respective input signals in time by a factor of one-half and provide the resulting signals to a line multiplexer 2528. The multiplexer 2528 alternately provides the signals applied to its two input ports during alternate horizontal line intervals to recover the signal YA/CA.

Figure 29:
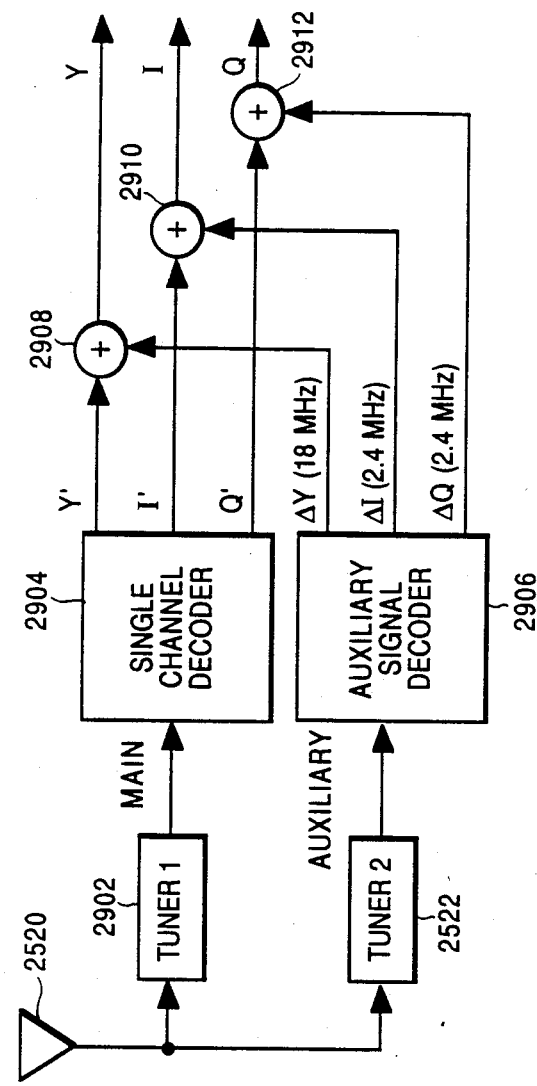
FIG. 29 is a block diagram of the advanced compatible television two-channel decoder shown in FIG. 1.

FIG. 29 is a block diagram of an exemplary two-channel decoder 134. In FIG. 29, an antenna 32 is coupled to two tuners 2902 and 2522 which tune respective RF channels conveying the transmitted main and auxiliary signals. A single channel decoder 2904 decodes the main signal produced by tuner 2902 to produce Y', I' and Q' component signals. The tuner 2902 and the decoder 2904 may be identical to the single channel decoder described above in reference to FIGS. 14–21. An auxiliary signal decoder 2906 expands the 6 MHz auxiliary signal provided by the tuner 2522 to produce an 18 MHz augmentation luminance signal, ΔY and 2.4 MHz augmentation color difference signals ΔI and ΔQ. The auxiliary signal decoder is described below in reference to FIGS. 26 and 27. The signals ΔY, ΔI and ΔQ are combined with the 525 LPF progressive scan signals Y', I' and Q' provided by the single channel encoder 2904 by the respective adders 2908, 2910, and 2912 to generate 1050 L/F interlace scan signals Y", I" and Q" that are applied to the widescreen HDTV display 136. The display 136 may be a conventional 525 L/F progressive scan display controlled by a field rate signal to shift the 525 displayed lines by one-half of one interline space from field to field to effect a 1050 LPF interlace scan display.

Figure 26:
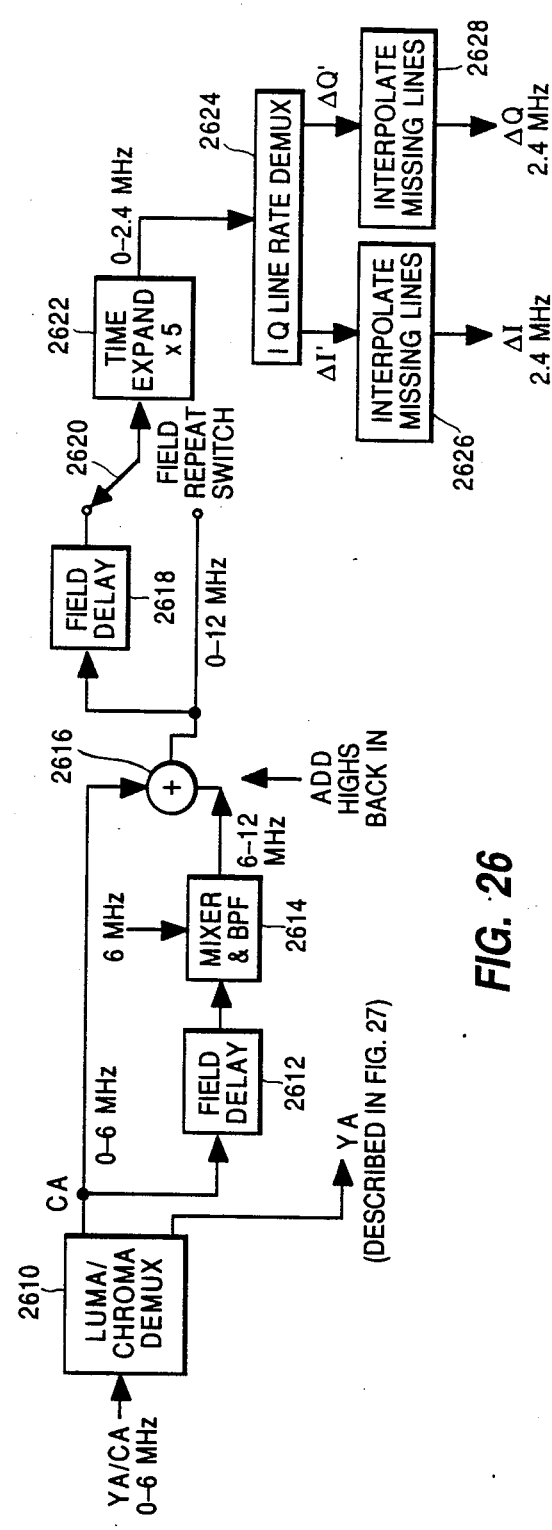
FIGS. 26 and 27 are block diagrams of respective chrominance and luminance augmentation signal decoders suitable for use in the advanced compatible television two-channel decoder shown in FIG. 1.

The circuitry shown in FIG. 26 includes a luma/chroma demultiplexer 2610 which separates the 150 chrominance samples, CA, and the 755 luminance samples, YA, from each horizontal line interval of the signal YA/CA provided by the multiplexer 2528 of FIG. 25. This circuitry reverses the multiplexing operation performed by the multiplexer 2434 described above in reference to FIG. 24. The samples YA are processed by circuitry described below in reference to FIG. 27. The samples CA are applied to a field delay element 2612. Field delayed signals provided by the element 2612 are up-converted by a mixer and band-pass filter 2614 to occupy a band of frequencies between 6 MHz and 12 MHz. The signal provided by the mixer and band-pass filter 2614 is added, by an adder 2616, to low frequency chrominance signals provided by the demultiplexer 2610. The output signal of the adder 2616 is applied to one pole of a switch 2620, another pole of which is coupled to receive a field delayed version of the signal provided by the adder 2616 via the field delay element 2618.

The switch 2620 is conditioned by a 15 Hz signal to pass the output signal provided by the adder 2616 during frame intervals in which the signal CA represents low frequency chrominance signals and to pass the signal provided by the delay element 2618 during frame intervals in which the signal CA represents high frequency chrominance signals. Alternatively, when motion-adaptive multiplexing of the signal CA is used by the encoding circuitry, the circuits shown in FIG. 26 may include motion-adaptive demultiplexing circuits of the type described below in reference to FIG. 27. The signal provided by the switch 2620 is expanded in time by a factor of 5 by circuitry 2622 to produce 750 samples of the signal CA per horizontal line interval. This operation reduces the frequency spectrum of the signal CA to 0–2.4 MHz. The time-expanded signal CA is applied to a line-rate demultiplexer 2624 which, during alternate horizontal line intervals, provides lines of samples of a reconstructed signal $\Delta I'$ at one output port and lines of samples of a reconstructed signal $\Delta Q'$ at another output port. The signals $\Delta I'$ and $\Delta Q'$ are applied to respective horizontal line interpolators 2626 and 2628 which derive interstitial lines of samples from the existing lines of samples to provide output signals $\Delta I$ and $\Delta Q$ each having 525 lines of samples per field interval and a horizontal frequency spectrum of 0–2.4 MHz.

Figure 27:
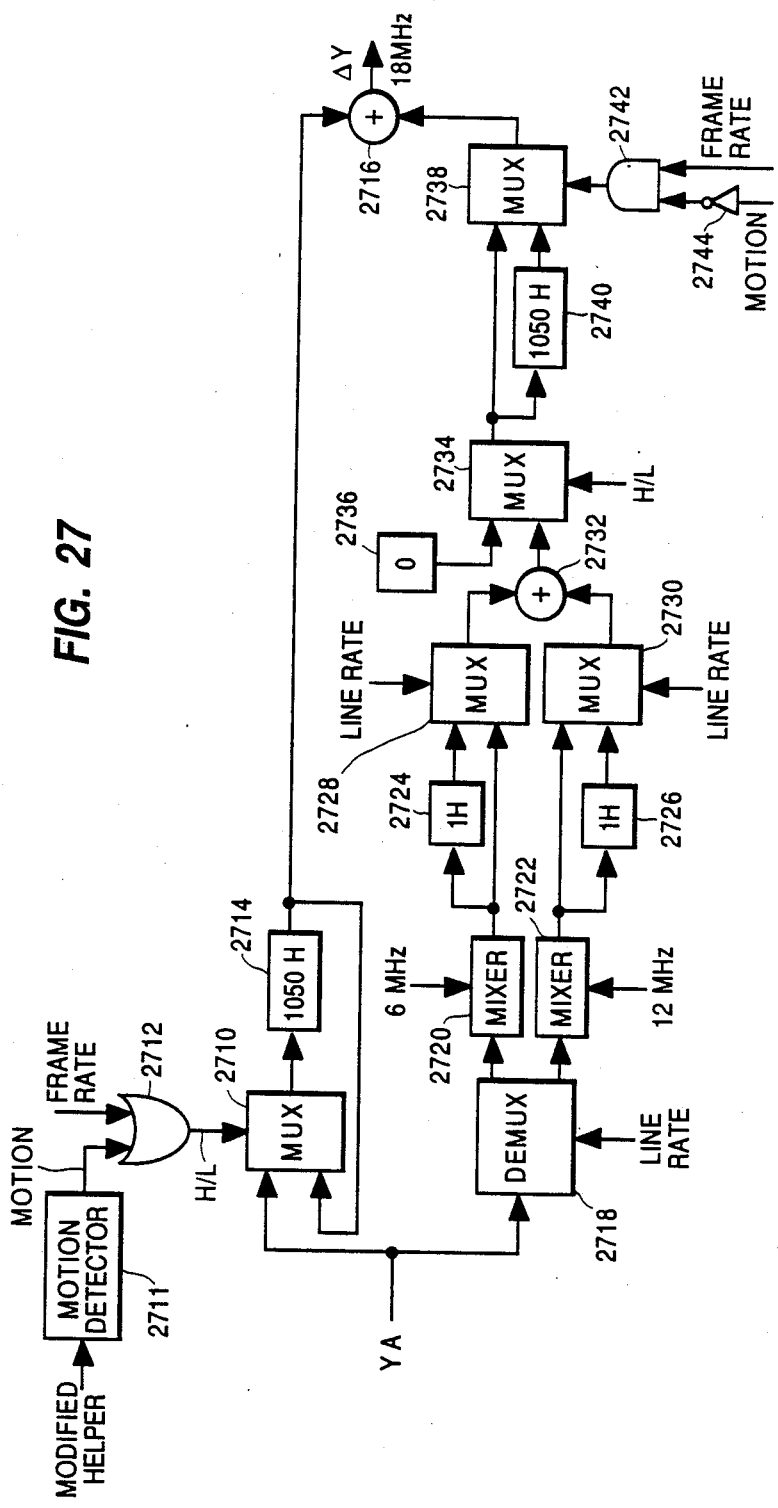

Exemplary circuitry for use as the luminance augmentation signal decoder is shown in FIG. 27. In FIG. 27, the signal YA is applied to one input port of a multiplexer 2710, the output port of which is coupled to the input port of a frame delay element 2714. The output port of the frame delay element 2714 is coupled to a second input port of the multiplexer 2710. A control signal for the multiplexer 2710 is a signal H/L which is the logical OR of a motion signal, MOTION provided by a motion detector 2711 and a 15 Hz square wave signal. This signal changes state at the frame rate. The motion detector 2711 may be identical to the detector 2260 described above in reference to FIGS. 22 and 28. The multiplexer 2710 is conditioned by the control signal H/L to pass the signal YA during alternate frames when no motion is present, or during every frame in moving portions of the image. In the intervening frames of still images, the control signal H/L conditions the multiplexer 2710 to recirculate signals provided by the frame delay element 2714. The output signal of the frame delay element 2714 is a low frequency component signal (0 Hz to 6 MHz) of the signal $\Delta Y$. This output signal is applied to one input port of an adder 2716. A second input port of the adder 2716 is coupled to receive high frequency components (6 MHz to 18 MHz) of the signal $\Delta Y$ for still images and a zero-valued signal for moving images. For still portions of an image the signal provided by the adder 2716 has a horizontal frequency spectrum of 0 Hz to 18 MHz but a temporal update period of only 1/15 of a second and, for moving portions of the image, a horizontal frequency spectrum of 0 Hz to 6 MHz and temporal update period of 1/30 of a second.

To generate the high frequency components of the signal $\Delta Y$, the signal YA provided by the luma/chroma demultiplexer 2610 of FIG. 26 is applied to a demultiplexer 2718. The demultiplexer 2718 is controlled by a square wave signal having a frequency of 15 KHz (one-half of the frequency, fH, of the 1050 LPF interlaced horizontal line synchronization signal) to provide alternate lines of samples of the signal YA to the mixer and band-pass filter circuits 2720 and 2722.

The circuits 2720 and 2722 reverse the frequency down-conversion of the 6–12 MHz and 12–18 MHz components of the $\Delta Y$ signal performed by the auxiliary channel encoder 142. The mixer and band pass filter 2720 modulates a 6 MHz carrier signal with the signals applied to its input port and passes the resultant signals through a band-pass filter (not shown) having a passband from 6 MHz to 12 MHz. This filter removes the baseband signal and any spurious modulation components. In the same manner, the mixer and filter 2722 modulates a 12 MHz carrier signal with the signals applied to its input port and band-pass filters the resultant modulated signals to occupy a band of frequencies from 12 MHz to 18 MHz.

The signals provided by the mixer and band-pass filter 2720 are applied to one input port of a multiplexer 2728 and to a 1 H delay element 2724. The delay element 2724 is coupled to provide its output signal to a second input port of the multiplexer 2728. The multiplexer 2728 is conditioned by the 15 KHz line rate switching signal to alternately provide the output signal of the circuitry 2720 and the output signal of the delay element 2724 during respective alternate horizontal line intervals. A 1 H delay element 2726 and multiplexer 2730 are configured in the same manner to alternately provide the output signal of the circuitry 2722 and the output signal of the delay element 2726 during respective alternate horizontal line intervals. The line rate signals applied to the multiplexers 2728 and 2730 are synchronized to the signals produced by the encoder circuits 142 so that, for still images, the multiplexer 2728 provides line averaged $\Delta Y$ signals occupying the 6 MHz to 12 MHz band of frequencies and the multiplexer 2730 provides line averaged $\Delta Y$ signals occupying the 12 MHz to 18 MHz band of frequencies. In moving portions of the image and during alternate frame intervals of still images, the signals provided by the multiplexers 2728 and 2730 are invalid.

The output signals of the multiplexers 2728 and 2730 are summed by an adder 2732 to produce, during still portions of an image, a signal representing components of the $\Delta Y$ signal in the 6 MHz to 18 MHz band of frequencies. This signal is applied to one input port of a multiplexer 2734. A second input port of the multiplexer 2734 is coupled to receive a zero-valued signal provided by a source of zero-valued signal 2736. The multiplexer 2734 is conditioned by the signal H/L provided by the OR gate 2712 to pass the signal provided by the adder 2732 during alternate frames of still portions of an image and to pass the zero-valued signal provided by the source 2736 otherwise.

The output signal of the multiplexer 2734 is applied to a one-frame (1050 H) delay element 2740 and to one input port of a multiplexer 2738. A second input port of the multiplexer 2738 is coupled to receive the frame delayed signal provided by delay element 2740. The multiplexer 2738 is conditioned by a control signal provided by an AND gate 2742 to pass the signal provided by the multiplexer 2734 during alternate frames of a still image (i.e., when the signal provided by the multiplexer 2734 includes line-averaged high frequency components) and during moving portions of the image (i.e., when the signal provided by the multiplexer 2734 is zero-valued). Only during the intervening frame intervals of still images, when the signal YA includes only low frequency components, is the multiplexer 2738 conditioned to pass the signal provided by the delay element 2740. In this configuration, the multiplexer 2738 passes a zero-valued signal for moving portions of an image and a high frequency ΔY signal for still portions of the image. The control signal for the multiplexer 2738 is the logical AND of the 15 Hz frame rate switching signal and the complement of the signal MOTION as provided by an inverter 2744.

The output signal of the multiplexer 2738 is applied to the second input port of the adder 2716 to produce the reconstructed signal ΔY. As set forth above, the signal ΔY has a frequency spectrum of 0 Hz to 18 MHz and a temporal update period of 1/15 of a second for still portions of an image and a frequency spectrum of 0 to 6 MHz and a temporal update period of 1/30 of a second for moving portions of the image.

In the described embodiment of the invention, the high and low frequency components of the signal ΔY are motion adaptively multiplexed on a frame basis. It is contemplated that these signals may be motion adaptively multiplexed on a field basis or on the basis of a number of field intervals greater than a frame interval.

Although it is not shown in the drawings, it is contemplated that the two channel decoder 134 may include timing signal generation circuits of the same type as the timing circuits 1432 described above in reference to FIG. 14, for generating a 16xfsc clock signal, the 6 MHz and 12 MHz sampled data carrier signals and the frame rate and line rate control signals used by the decoder 134. To ensure proper reconstruction of the image, it may be desirable to synchronize the encoder 142 to the decoder 136 by including a timing reference signal such as a pseudo-random sequence in one or both of the signals MAIN and AUX. Exemplary circuitry for generating and decoding such a timing reference signal is disclosed in the above-referenced U.S. patent application Ser. No. 241,277 and in U.S. Pat. No. 4,309,712 entitled "Error Coding For Video Disc System" which are hereby incorporated by reference. Alternatively, the signal AUX may include a modified synchronizing signal such as that used in the television system proposed by NHK, the Japan Broadcasting Corporation, described in an article by R. Hopkins entitled "Advanced Television Systems", IEEE Transactions on Consumer Electronics, February 1988, pp. 4-5. Accurate timing information may be derived from the zero crossing points of this synchronizing signal.

As set forth above in reference to FIG. 29, the signal ΔY, provided by the luminance augmentation signal decoder, and the signals ΔI and ΔQ provided by the chrominance augmentation signal decoder, are combined with the respective signals Y', I' and Q' to produce widescreen HDTV signals Y", I" and Q" for display on the widescreen HDTV display 136. The image produced in response to the signals Y", I" and Q" has substantially full HDTV detail in still areas and detail greater than that of a standard NTSC image but less than that of an HDTV image in moving areas of the image.

The invention claimed is:

1. A system for generating encoded main and auxiliary signals representing a high-definition widescreen image, comprising:
 a source of input video signal representing said high-definition widescreen image having a level of detail that is substantially greater than that of a conventional video image;
 first signal encoding means, coupled to said source of input video signal for generating said encoded main video signal representing an enhanced image having a level of detail that is greater than that of a conventional video image but less than that of said high-definition widescreen image;
 decoding means, coupled to said first signal encoding means for decoding said encoded main video signal to generate a decoded main video signal;
 signal differencing means, coupled to said decoding means, for generating a difference signal representing the difference between said input signal and said decoded main video signal;
 second signal encoding means, coupled to said signal differencing means, for generating said encoded auxiliary video signal representing said difference signal.

2. The system set forth in claim 1, wherein said first signal encoding means includes means responsive to said input video signal for generating a first video signal representing a conventional video image and a second video signal representing enhancements to said conventional video image and means for combining said first and second video signals to generate said encoded main video signal.

3. The system set forth in claim 1 wherein:
 said input video signal occupies a band of frequencies from 0 Hz to L MHz;
 said first signal encoding means includes low-pass filtering means for processing said input video signal to provide a filtered video signal occupying a band of frequencies from 0 Hz to K MHz, where K is less than L;
 said signal differencing means produces said difference signal occupying a band of frequencies from 0 Hz to L Mhz; and
 said second signal encoding means includes:
  means for separating said difference signal into a first component signal occupying a band of frequencies from 0 Hz to J MHz and a second component signal occupying a band of frequencies from J MHz to H MHz, where J is less than H and H is a not greater than L;
  means for encoding said second component signal to generate an encoded second component signal occupying a band of frequencies from 0 Hz to J Mhz; and
  means for time-division multiplexing said first component signal and said encoded second component signal to generate said auxiliary encoded video signal occupying a band of frequencies from 0 Hz to J MHz.

4. The system set forth in claim 1 wherein:
 said input video signal is an N line-per-frame interlace scan signal, where N is an integer;
 said first signal encoding means includes means for converting said input video signal to a M line-per-frame progressive scan intermediate video signal and means for encoding said intermediate video signal to generate said encoded main video signal, being an M line-per-frame interlace scan signal, where M is an integer not greater than N;
 said decoding means includes means for processing said encoded main video signal to develop said decoded main video signal, being an M line-per-frame progressive scan signal;

said differencing means includes means for subtracting said decoded main video signal from said input video signal to generate said difference signal having 2M lines per frame.

5. The system set forth in claim 4 wherein N equals 1050 and M equals 525.

6. In a television receiver for receiving an encoded main video signal representing an extended definition television image having a level of detail greater than that of a conventional video image but less than that of a high definition video image from which said main video signal was derived and an encoded auxiliary signal representing an augmentation of said extended definition television image, said auxiliary signal representing a difference between a decoded version of said encoded main video signal and said high definition video signal from which said extended definition main signal was derived, signal processing circuitry comprising:
  means for decoding said main signal to produce first baseband signals representing said extended definition television image;
  means for decoding said auxiliary signal to produce second baseband signals representing said augmentation of said extended definition television image; and
  means for combining said first and second baseband signals to develope third baseband signals representing an augmented extended definition television image.

7. A television signal processing system comprising:
  means for receiving an encoded main video signal representing an extended definition television image having a level of detail that is greater than that of a conventional video image;
  means for receiving an auxiliary signal having first and second component signals, representing respective first and second augmentation signals for said main video signal which occupy respective first and second bands of frequencies, wherein said second component signal is encoded to occupy substantially the same band of frequencies as said first component signal and said first and second component signals are time division multiplexed;
  main signal processing means, coupled to receive said encoded main video signal, for generating therefrom a baseband decoded main video signal;
  auxiliary video signal processing means, coupled to receive said auxiliary signal, including means for separating said first and second component signals therefrom, means for decoding said second component signal and means for combining said first component signal and said decoded second component signal to develop a baseband augmentation signal; and
  combining means, coupled to said main signal processing means and to said auxiliary signal processing means, for combining said baseband decoded main video signal and said baseband augmentation signal to generate an output signal representing a video image having a level of detail greater than that of said extended definition television image.

8. The television signal processing system set forth in claim 7, wherein:
  said first component signal of said auxiliary video signal includes a signal occupying a band of frequencies from 0 Hz to N MHz which represents an augmentation of said main video signal in the band of frequencies from 0 Hz to N MHz;
  said second component signal of said auxiliary video signal includes signals occupying a band of frequencies from 0 Hz to N MHz which represents a augmentation of said main video signal in a band of frequencies from N MHz to P MHz; where P is greater than N;
  said first and second component signals of said auxiliary video signal are time division multiplexed on a basis of G fields, where G is an integer, for still sequences of said extended definition television image and said auxiliary video signal includes only said first component signal for motion sequences of said extended definition television image; and
  said auxiliary signal processing means includes:
    means coupled to said main video signal processing means for developing a motion signal indicative of motion sequences of said extended definition television image;
    demultiplexing means for separating said first and second component signals from said auxiliary signal;
    frequency conversion means, coupled to said demultiplexing means for processing said second component signal to develop a frequency-shifted second component signal which occupies said band of frequencies from N MHz to P MHz;
    means, coupled to said demultiplexing means and including signal storage means and responsive to said motion signal, for selectively repeating said first component signal during alternate intervals of G fields to develop a continuous first component signal;
    means, including signal storage means, coupled to said demultiplexing means and to said frequency conversion means and responsive to said motion signal, for selectively repeating one of said second component signal and said frequency-shifted second component signal during alternate ones of said G field intervals to develop a continuous frequency-shifted second component signal; and
    means for combining said continuous first component signal and said continuous frequency-shifted second component signal to generate said baseband augmentation signal.

9. The television signal processing system set forth in claim 8 wherein said G field intervals equals one frame interval.

10. The television signal processing system set forth in claim 9, wherein:
  said second component signal of said auxiliary signal includes first and second sub-component signals each occupying a band of frequencies from 0 Hz to N MHz, said first sub-component signal representing an augmentation of said main video signal in a band of frequencies from N MHz to Q MHz and said second sub-component signal representing an augmentation of said main component signal in a band of frequencies from Q MHz to P MHz, where said first and second sub-component signals are time division multiplexed on a line basis; and
  said frequency conversion means includes:
    means for modulating an N MHz carrier signal with said first sub-component signal to generate a frequency-shifted first sub-component signal occupying a band of frequencies from N MHz to Q MHz;
    means for modulating a Q MHz carrier signal with said second sub-component signal to generate a frequency-shifted second sub-component signal occupying a band of frequencies from Q MHz to M MHz;

means, including signal storage means, for alternately repeating a line of samples of said frequency-shifted first sub-component signal to generate a continuous frequency-shifted first sub-component signal;

means, including signal storage means, for alternately repeating a line of samples of said frequency-shifted second sub-component signal to generate a continuous frequency-shifted second sub-component signal; and means for combining said continuous frequency-shifted first and second sub-component signals to generate said frequency shifted second component signal.

* * * * *